US012685972B2

(12) United States Patent
Mohammadifakhr et al.

(10) Patent No.: US 12,685,972 B2
(45) Date of Patent: Jul. 21, 2026

(54) HOLLOW FIBER AND A PROCESS FOR PREPARATION THEREOF

(71) Applicant: E. & J. Gallo Winery, Modesto, CA (US)

(72) Inventors: Mehrdad Mohammadifakhr, Enschede (NL); Antoine Kemperman, Enschede (NL); Joris de Grooth, Enschede (NL); Krzysztof Trzaskus, Kgs. Lyngby (DK)

(73) Assignee: E. & J. Gallo Winery, Modesto, CA (US)

( * ) Notice: Subject to any disclaimer, the term of this patent is extended or adjusted under 35 U.S.C. 154(b) by 564 days.

(21) Appl. No.: 18/003,767

(22) PCT Filed: Jun. 25, 2021

(86) PCT No.: PCT/EP2021/067494

§ 371 (c)(1),
(2) Date: Dec. 29, 2022

(87) PCT Pub. No.: WO2022/002788

PCT Pub. Date: Jan. 6, 2022

(65) Prior Publication Data

US 2023/0265585 A1 Aug. 24, 2023

(30) Foreign Application Priority Data

Jun. 29, 2020 (DK) ............................ PA202070424

(51) Int. Cl.

| | |
|---|---|
| ***B01D 69/08*** | (2006.01) |
| ***B01D 61/00*** | (2006.01) |
| ***B01D 67/00*** | (2006.01) |
| ***B01D 69/12*** | (2006.01) |
| ***B01D 69/14*** | (2006.01) |
| ***B01D 71/40*** | (2006.01) |
| ***B01D 71/60*** | (2006.01) |
| ***B01D 71/64*** | (2006.01) |
| ***D01D 1/06*** | (2006.01) |
| ***D01D 5/24*** | (2006.01) |

(52) U.S. Cl.

CPC ....... *B01D 69/088* (2013.01); *B01D 61/0022* (2022.08); *B01D 67/0009* (2013.01); *B01D 67/00933* (2022.08); *B01D 69/087* (2013.01); *B01D 69/1251* (2022.08); *B01D 69/14111* (2022.08); *B01D 71/40* (2013.01); *B01D 71/601* (2022.08); *B01D 71/641* (2022.08); *D01D 1/065* (2013.01); *D01D 5/24* (2013.01); *B01D 2323/06* (2013.01); *B01D 2323/21839* (2022.08); *B01D 2323/50* (2013.01); *B01D 2325/34* (2013.01); *D10B 2331/02* (2013.01)

(58) Field of Classification Search

CPC ............ B01D 61/0022; B01D 67/0006; B01D 67/0009; B01D 67/00931; B01D 67/00933; B01D 69/08; B01D 69/087; B01D 69/088; B01D 69/1212; B01D 69/1214; B01D 69/1251; B01D 69/14111; B01D 71/40; B01D 71/56; B01D 71/601; B01D 71/641; B01D 2323/06; B01D 2323/21839; B01D 2323/36; B01D 2323/50; D01D 5/24; D01F 1/08

See application file for complete search history.

(56) References Cited

U.S. PATENT DOCUMENTS

| | | | |
|---|---|---|---|
| 2014/0008292 A1 | 1/2014 | Wang et al. |
| 2014/0332468 A1 | 11/2014 | Tang et al. |
| 2020/0016548 A1 | 1/2020 | Spulber et al. |
| 2020/0078744 A1 | 3/2020 | Trzaskus et al. |

FOREIGN PATENT DOCUMENTS

| | | |
|---|---|---|
| JP | 2020507456 A | 3/2020 |
| KR | 20180104158 | 9/2018 |
| WO | 2012074487 A1 | 6/2012 |
| WO | 2013043118 A1 | 3/2013 |
| WO | 2017137361 | 8/2017 |
| WO | 2018167221 A1 | 9/2018 |

OTHER PUBLICATIONS

Fang et al. "Composite forward osmosis hollow fiber membranes: Integration of RO- and NF-like selective layers to enhance membrane properties of anti-scaling and anti-internal concentration polarization" (Year: 2012).*

Gao et al. "Design of nanofiltration (NF) hollow fiber membranes made from functionalized bore fluids containing polyethyleneimine (PEI) for heavy metal removal" (Year: 2020).*

Fang et al. "Composite forward osmosis hollow fiber membranes: Integration of RO- and NF-like selective layers to enhance membrane properties of anti-scaling and anti-internal concentration polarization" Journal of Membrane Science, Available online Dec. 31, 2011, vol. 394-395, Mar. 1, 2012, ISSN: 0376-7388, doi: 10.1016/j.memsci.2011.12.034, 11 pages.

International Search Report, European Patent Office, Application No. PCT/EP2021/067494, mailed Nov. 12, 2021, 3 pages.

(Continued)

*Primary Examiner* — Krishnan S Menon
*Assistant Examiner* — Tak L. Chiu
(74) *Attorney, Agent, or Firm* — Dentons US LLP

(57) ABSTRACT

A process for preparing a hollow fiber includes the steps of providing a dope solution including polyamide imide (PAI), providing an aqueous bore solution including polyethylene imine (PEI), extruding the dope solution in an cross-sectional annular shape and ejecting the bore solution in the center of the annular shape, allowing the PAI and the PEI to react, thereby forming an internal surface layer including the cross-linked reaction product, and forming a polyamide Thin Film Composite (TFC) layer by interfacial reaction of aqueous di- or triamine compound and organic di- or triacylhalide compound on the internal surface layer including the cross-linked reaction product.

11 Claims, 12 Drawing Sheets

(56) References Cited

OTHER PUBLICATIONS

Li et al. "Deformation and reinforcement of thin-film composite (TFC) polyamide-imide (PAI) membranes for osmotic power generation" Journal of Membrane Science, vol. 434, May 1, 2013Available online Feb. 4, 2013, ISSN: 0376-7388, DOI: 10.1016/j.memsci.2013.01.049, 14 pages.
Japan Patent Office, Notice of Reasons for Rejection, Application No. 2022-581400, Mailed Sep. 12, 2024, 2 pages.
Mohammadifakhr et al. Increasing the success rate of interfacial polymerization on hollow fibers by the single-step addition of an intermediate layer, Desalination 491:1-9, 2020.
Setiawan et al., Fabrication of novel poly(amide-imide) forward osmosis hollow fiber membranes with a positvely charged nanofiltration-like selective layer, Journal of Membrane Science 369:196-205, 2011.
Korean Office Action regarding Korean App. No. 10-2023-7002901, Apr. 7, 2026.

* cited by examiner

HOLLOW FIBER AND A PROCESS FOR PREPARATION THEREOF

CROSS-REFERENCE TO RELATED APPLICATIONS

This application claims priority of International Application No. PCT/EP2021/067494, filed Jun. 25, 2021, which claims the benefit of Denmark Patent Application No. PA 2020 70424, filed Jun. 29, 2020. The entire disclosure of International Application No. PCT/EP2021/067494, filed Jun. 25, 2021, is incorporated herein by reference.

TECHNICAL FIELD

The disclosure relates to a hollow fiber, a process for preparation thereof, and a hollow fiber module comprising a bundle of hollow fibers. The hollow fiber has a high integration between the support membrane and the selective layer ensuring physical stability under various conditions.

BACKGROUND

Hollow fiber modules are becoming increasing popular for forward osmosis (FO). FO process utilizes an osmotic pressure gradient instead of hydraulic pressure used in reverse osmosis (RO) as a driving force, thus it has the potential to extract water with less energy consumption. FO is well suited for a wide range of potential applications, including wastewater treatment, water purification, seawater desalination, food & beverage, as well as power generation.

In the food and beverage field it has been suggested in WO2019215226 to use hollow fiber modules for enriching the concentration of ethanol in an ethanolic liquid like beer or wine. Other emerging fields include concentration of liquid coffee prior to freeze drying or spray drying, concentration of coconut water, concentration of fruit juices etc.

Hollow fiber modules are also suitable for reverse osmosis (RO) operation, such as low pressure RO. Hollow fiber modules used in low pressure RO operation is e.g. useful in producing drinking water from an impure source.

The hollow fibers are generally produced by hollow fiber spinning, in particular dry-jet wet spinning as disclosed in e.g. Shi et al. (J Membrane Sci. 305 (2007) 215-225).

WO 2012074487 relates to a method for forming a hollow fiber membrane comprising a polyamide imide (PAI) hollow fiber substrate having a polyethyleneimine (PEI)-cross-linked PAI surface layer. The membrane is suitable for forward osmosis applications. The method comprises contacting the PAI hollow fiber substrate on the outside with an aqueous solution of polyethyleneimine (PEI) under conditions suitable for cross-linking PAI in the surface layer of the PAI hollow fiber substrate by PEI.

The aspects of the disclosed embodiments are directed to provide a robust hollow fiber with high physical integrity. Particularly, it is an object to obtain a high adhesion between the support membrane and the selective layer so that delamination is avoided or reduced. Furthermore, the aspects of the disclosed embodiments are directed to provide a membrane with less support defects, i.e. defects in the selective layer occasioned by the surface topology of the hollow fiber.

SUMMARY

A first aspect of the disclosed embodiments relates to a process for preparing a hollow fiber comprising the steps of:

a) providing a dope solution comprising polyamide imide (PAI),
b) providing an aqueous bore solution comprising polyethylene imine (PEI),
c) extruding the dope solution in a cross-sectional annular shape and ejecting the bore solution in the center of the annular shape,
d) allowing the PAI and the PEI to react, thereby forming an internal surface layer comprising the cross-linked reaction product, and
e) forming a polyamide Thin Film Composite (TFC) layer by interfacial reaction of aqueous di- or triamine compound and organic di- or triacylhalide compound on the internal surface layer comprising the cross-linked reaction product.

Adding PEI in the aqueous bore solution allows for the formation of an internal surface layer, also termed as gutter layer, in the lumen (inner surface) of the hollow fiber membrane by reacting the PAI with the PEI. The internal surface layer functions as a primer for attaching the TFC layer to the PAI support layer. Thus, the presence of the internal surface layer ensures a high adhesion and prevents delamination of the TFC layer. In addition, PEI contains amine groups and it is supposed that these groups together with the di- and triamine compound participate in the formation of the TFC layer, thereby forming a covalent attachment of the TFC layer to the PAI support layer through the gutter layer.

In some implementations of the disclosed embodiments, the gutter layer has a tendency to even out the surface roughness often observed on the inner surface of the hollow fiber. The smooth surface provided by the gutter layer thus reduces support defects, i.e. defects in the TFC layer occasioned by height variations in the surface topology.

In some embodiments of the present disclosure the smooth gutter layer provides for a slower diffusion rate of the di- or triamine compound during the formation of the interfacial reaction, ensuring a thinner and/or denser TFC layer.

According to a second aspect, there is provided a hollow fiber comprising an outer support layer, an internal surface layer, and a polyamide Thin Film Composite (TFC) layer, wherein the outer support layer comprises a polyamide imide (PAI), the internal surface layer comprises the reaction product of PAI and polyethylene imine (PEI), and the TFC layer comprises the reaction product of a di- or triamine compound and a di- or triacylhalide compound.

According to a third aspect of the disclosed embodiments, there is provided a hollow fiber module comprising a bundle of hollow fibers as described in the second aspect.

The foregoing and other objects are achieved by the features of the independent claims. Further implementation forms are apparent from the dependent claims, the description and the figures.

In a possible implementation form of the first aspect the monomer of the PAI has the following chemical structure:

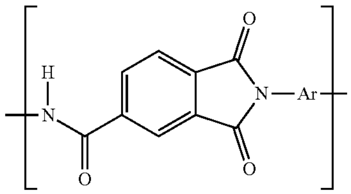

in which Ar is an aromatic group selected from

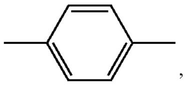 , 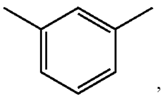 ,

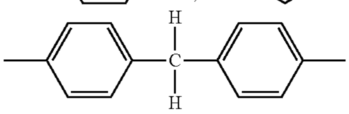 , or

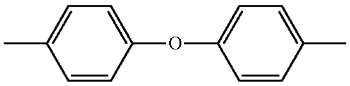 .

In a possible implementation form of the first aspect the dope solution further comprises an aprotic solvent.

In a possible implementation form of the first aspect the aprotic solvent is selected from the group consisting of N-methyl pyrrolidone (NMP), dimethylacetamide (DMAC), dimethylsulfoxide (DMSO), and dimethylformamide (DMF), or mixtures thereof.

In a possible implementation form of the first aspect the dope solution further comprises a polymer selected from the group consisting of polyphenylsulfone (PPSU), polyethersulfone (PES), Sulfonated polyethersulfone (SPES) polysulfone (PSU), polyetheretherketone (PEEK), high-temperature sulfone resins, self-reinforced polyphenylene, polybenzimidizole (PBI), polyimide (PI), polyetherimide (PEI), polyphenylene sulfide (PPS), and mixtures thereof.

In a possible implementation form of the first aspect the solution viscosity of the PAI in 25% NMP and measured at 40° C. is 30,000 cP or less.

In a possible implementation form of the first aspect the dope solution further comprises a glycol.

In a possible implementation form of the first aspect the glycol is selected among ethylene glycol, 1,2-propylene glycol, 1,3-propylenen glycol, glycerol or polyethylene glycol(PEG). Usually the PEG has molecular weight of 10,000 D or less, such as PEG 200 or PEG400.

In a possible implementation form of the first aspect the PEI of the aqueous bore solution has an average molecular weight (Mw) of 2,000 g/mol or above, such as 25,000 g/mol or above, and preferably 100,000 g/mol and above.

a possible implementation form of the first aspect the PEI is branched.

In a possible implementation form of the first aspect the aqueous bore solution further comprises an aprotic solvent.

In a possible implementation form of the first aspect the aprotic solvent is selected from the group consisting of N-methyl pyrrolidone (NMP), dimethylacetamide (DMAC), dimethylsulfoxide (DMSO), and dimethylformamide (DMF), or mixtures thereof.

In a possible implementation form of the first aspect the step c) is performed by dry-jet wet spinning.

In a possible implementation form of the first aspect the nascent hollow fiber after extrusion is moved through an air gap before being coagulated in a non-solvent.

In a possible implementation form of the first aspect the air gap is between 5 and 40 cm.

In a possible implementation form of the first aspect a plurality of the hollow fibers is assembled in a module before the polyamide TFC layer is prepared.

In a possible implementation form of the first aspect the di- or triamine compound is selected among m-phenylenediamine (MPD), diethylene triamine, dipropylene triamine, phenylenetriamine, bis(hexamethylene)triamine, bis(hexamethylene)triamine, bis(3-aminopropyl)amine, hexamethylenediamine, N-tallowalkyl dipropylene, 1,3,5-triazine-2,4,6-triamine, and mixtures of these compounds.

In a possible implementation form of the first aspect the di- or triacyl halide compound is selected among trimesoyl chloride (TMC), trimesoyl bromide, isophthaloyl chloride (IPC), isophthaloyl bromide, terephthaloyl chloride (TPC), terephthaloyl bromide, adipoyl chloride, cyanuric chloride and mixtures of these compounds.

In a possible implementation form of the first aspect aquaporin water channels are incorporated into the TFC layer.

In a possible implementation form of the first aspect the aquaporin water channels are assembled in a nanostructure comprising polyethylene imine.

In a possible implementation form of the first aspect the polyethyleneimine has an average molecular weight of between about 2,000 Da to about 10,000 Da, such as between about 3,000 Da to about 5,000 Da.

In a possible implementation form of the first aspect the aquaporin water channel is solubilized in a detergent prior to the assembling in a nanostructure comprising polyethyleneimine.

In a possible implementation form of the first aspect the detergent is selected from the group consisting of lauryl dimethylamine N-oxide (LDAO), octyl glucoside (OG), dodecyl maltoside (DDM) or a combination thereof.

In a possible implementation form of the first aspect the aquaporin water channels are provided in a vesicle prior to the incorporation in the TFC layer.

In a possible implementation form of the first aspect the vesicle comprises an amphiphilic diblock copolymer of the PMOXA-PDMS type and a reactive end group functionalized PDMS.

In a possible implementation form of the first aspect the said PMOXA-PDMS is selected from the group consisting of $PMOXA_{10-40}$-$PDMS_{25-70}$ and mixtures thereof.

In a possible implementation form of the first aspect the mixture comprises at least a first amphiphilic diblock copolymer of the general formula $PMOXA_{10-28}$-$PDMS_{25-70}$ and a second amphiphilic diblock copolymer of the general formula $PMOXA_{28-40}$-$PDMS_{25-70}$.

In a possible implementation form of the first aspect the said reactive end group functionalised PDMS is functionalized with one or more of amine, carboxylic acid, and/or hydroxy groups.

In a possible implementation form of the first aspect further comprising a triblock copolymer of the PMOXA-PDMS-PMOXA type.

In a possible implementation form of the first aspect the TFC layer is present on the inside of the fibers.

In a possible implementation form of the second aspect the outer support layer further comprises a polymer selected from the group consisting of polyphenylsulfone (PPSU), polyethersulfone (PES), polysulfone (PSU), polyetheretherketone (PEEK), high-temperature sulfone resins, self-reinforced polyphenylene, polybenzimidizole (PBI), polyimide (PI), polyetherimide (PEI), polyphenylene sulfide (PPS), and mixtures thereof.

In a possible implementation form of the second aspect the solution viscosity of the PAI in 25% NMP and measured at 40° C. is 30,000 cP or less.

In a possible implementation form of the second aspect the PEI has an average molecular weight (Mw) of 100,000 g/mol or above.

In a possible implementation form of the second aspect the PEI is branched.

In a possible implementation form of the second aspect the di- or triamine compound is selected among m-phenylenediamine (MPD), diethylene triamine, dipropylene triamine, phenylenetriamine, bis(hexamethylene)triamine, bis (hexamethylene)triamine, bis(3-aminopropyl)amine, hexamethylenediamine, N-tallowalkyl dipropylene, 1,3,5-triazine-2,4,6-triamine, and mixtures of these compounds.

In a possible implementation form of the second aspect the di- or triacyl halide compound is selected among trimesoyl chloride (TMC), trimesoyl bromide, isophthaloyl chloride (IPC), isophthaloyl bromide, terephthaloyl chloride (TPC), terephthaloyl bromide, adipoyl chloride, cyanuric chloride and mixtures of these compounds.

In a possible implementation form of the second aspect the aquaporin water channels are incorporated into the TFC layer.

In a possible implementation form of the second aspect the aquaporin water channels are assembled in a nanostructure comprising polyethylene imine.

In a possible implementation form of the second aspect the polyethyleneimine has an average molecular weight of between about 2,000 Da to about 10,000 Da, such as between about 3,000 Da to about 5,000 Da.

In a possible implementation form of the second aspect the aquaporin water channel is solubilized in a detergent prior to the assembling in a nanostructure comprising polyethyleneimine.

In a possible implementation form of the second aspect the detergent is selected from the group consisting of lauryl dimethylamine N-oxide (LDAO), octyl glucoside (OG), dodecyl maltoside (DDM) or a combination thereof.

In a possible implementation form of the second aspect the aquaporin water channels are provided in a vesicle.

In a possible implementation form of the second aspect the vesicle comprises an amphiphilic diblock copolymer of the PMOXA-PDMS type and a reactive end group functionalized PDMS.

In a possible implementation form of the second aspect the said PMOXA-PDMS is selected from the group consisting of $PMOXA_{10-40}$-$PDMS_{25-70}$ and mixtures thereof.

In a possible implementation form of the second aspect the mixture comprises at least a first amphiphilic diblock copolymer of the general formula $PMOXA_{10-28}$-$PDMS_{25-70}$ and a second amphiphilic diblock copolymer of the general formula $PMOXA_{28-40}$-$PDMS_{25-70}$.

In a possible implementation form of the second aspect the reactive end group functionalised PDMS is functionalized with one or more of amine, carboxylic acid, and/or hydroxy groups.

In a possible implementation form of the second aspect the further comprising a triblock copolymer of the PMOXA-PDMS-PMOXA type.

In a possible implementation form of the second aspect the wall thickness of the hollow fiber is 0.10±0.01 mm or more.

In a possible implementation form of the second aspect the inner dimeter of the hollow fiber is 0.80±0.01 mm or more.

In a possible implementation form of the second aspect the porosity of the hollow fiber is 75% or above.

In a possible implementation form of the third aspect the hollow fiber module comprises a shell around the bundle of hollow fibers, an inlet and an outlet connected to the lumen of the hollow fibers in each end of the bundle for passing a first solution through the lumen side of the module, wherein an inlet and an outlet are provided in the shell for passing a second solution through the shell side of the module.

In a possible implementation form of the third aspect the bundle of hollow fibers is potted in each end of the module for the formation of a liquid tight sealing between the outer surface of hollow fibers and the shell.

These and other aspects will be apparent from and the embodiment(s) described below.

DETAILED DISCLOSURE

The hollow fibers are generally produced by a process termed dry-jet wet spinning, where the dope solution is extruded through the spinneret together with the bore fluid. The dope solution is extruded through a double-orifice spinneret in an annular shape and the bore solution is extruded through the center of the annular shape. The double-orifice spinneret comprises an outer annular die gap for the dope solution and a central die gap for the bore solution. The spun hollow fibers enter a coagulation bath after experiencing a definite air gap distance. In the coagulation bath the solid hollow fibers are formed by non-solvent induced phase separation.

The PAI of the nascent hollow fiber is modified after extrusion by reaction with PEI present in the bore solution. More specifically, the carbonyl groups of the PAI is reacted with the amine groups of PEI to form a cross-linked polymer. After a certain reaction time the nascent hollow fiber is coagulated in a coagulation bath.

The PAI support layer modified with the internal cross-linked reaction product between PAI and PEI is further modified by forming a thin film composite (TFC) layer through interfacial polymerization. The TFC layer may be prepared using an amine reactant, preferably an aromatic amine, such as a diamine or triamine, e.g. 1,3-diaminobenzene (m-Phenylenediamine—MPD) in an aqueous solution, and an acyl halide reactant, such as a di- or triacid chloride, preferably an aromatic acyl halide, e.g. benzene-1,3,5-tricarbonyl chloride (TMC) dissolved in an organic solvent where said reactants are combined in an interfacial polymerization reaction.

The amine groups of the di- or tri-amine compound and the amine groups of the PEI will compete with the acyl halide groups of the acyl halide compound for reaction. Thus, it is believed that the TFC layer is covalently bound to the PAI support membrane through the gutter layer.

PAIs are thermoplastic amorphous polymers possessing a positive synergy of properties from both polyamides and polyimides and thus have exceptional mechanical, thermal and chemical resistant properties. PAI presents a good chemical stability at a wide pH range and a high resistance to many organic solvents because of its ability to form intra- and inter-chain hydrogen bonding. In addition, PAI can be utilized in hollow fiber membrane fabrication using non-solvent induced phase separation (NIPS) technique. PAIs are mainly produced by Solvay Advanced Polymers under the trademark Torlon (Torlon®). There are three types of Torlon® PAI materials that are particular useful in membrane fabrication: Torlon® 4000T-LV (low viscosity), Torlon® 4000T-MV (medium viscosity), Torlon® 4000T-HV (high viscosity), and a finer particles size version, Torlon® 4000TF. In one embodiment, Torlon® 4000T-TF is used in the present disclosure. Torlon® PAI powders are soluble in dipolar aprotic solvents such as N-methyl pyrrolidone (NMP), dimethylacetamide (DMAC), dimethylsulfoxide (DMSO) and dimethylformamide (DMF). Torlon® 4000T-

TF has the appearance of a fine yellow powder and a solution viscosity of 7,000 cP in 25% NMP measured at 40° C.

While the membrane is expected to function for any semi-permeable membrane described above and capable of performing a forward osmosis process, the water flux generally becomes more efficient when aquaporin water channels are incorporated into the TFC layer. Aquaporin water channels are transmembrane proteins widely occurring in nature for selective transportation of water in or out of cells. In an industrial setting, the aquaporin water channels in a semi-permeable membrane ensure the flow of water by osmosis, while other solutes in the solution are rejected. The presence of active aquaporin water channels thus assists the semi-permeable membrane rejecting solutes and in promoting the penetration of water through the membrane.

The aquaporin water channels are incorporated in the membrane in the active conformation for at least a significant amount of the molecules. According to an aspect of the disclosed embodiments, the activity of the aquaporin water channels is maintained when the aquaporin water channels are assembled in a nanostructure comprising polyalkyleneimine, such as polyethyleneimine. As explained in further details in WO17137361, which is incorporated herein in its entirety, polyalkyleneimine, such as polyethyleneimine (PEI), form self-assembled nanostructures with transmembrane proteins, such as aquaporin water channels. The nanostructures ensure that at least a part of the aquaporin water channels remain active even after incorporation into the TFC layer. It is currently believed that the polymer interacts with the transmembrane protein to prevent it from reacting with monomers participating in the formation of a TFC layer. Furthermore, it is currently believed that the PEI of the aquaporin nanoparticle react with the PAI and thus become integrated in gutter layer.

Generally, the PEI is a substantially linear or branched polymer having an average molecular weight of between about 2,000 Da to about 10,000 Da, such as between about 3,000 Da to about 5,000 Da. It is currently believed that the relatively short polymer interacts with the transmembrane protein to prevent it from reacting with monomers participating in the formation of a TFC layer, while at the same time not substantially inhibiting the interaction with water.

To prevent aggregation of aquaporin water channels, it may be an advantage to have the aquaporin water channel solubilized in a detergent prior to the assembling in a nanostructure comprising polyalkyleneimine. Due to the natural occurrence of the aquaporin water channel in the cell membrane, the protein displays a hydrophobic domain. It is believed that the hydrophobic domain of a detergent interacts with the hydrophobic domain of the aquaporin water channel, thereby forming a solubilized protein. While the aquaporin water channel may be solubilized by a number of detergents, it is currently preferred to use a detergent selected from the group consisting of LDAO, OG, DDM or a combination thereof.

In another embodiment of the present disclosure the aquaporin water channels are provided in a vesicle prior to the incorporation in the TFC layer. Vesicles are the natural environment for the aquaporin water channels and the vesicles may be formed by a number of different membrane forming materials, including the naturally occurring phospholipids. In a certain embodiment of the present disclosure the vesicle is formed of an amphiphilic diblock copolymer, such as poly(2-methyloxazoline)-block-poly(dimethyl siloxane) diblock copolymer (PMOXA-PDMS) and a reactive end group functionalized poly(dimethyl siloxane) (PDMS). As explained in further details in WO 2018/141985, which is incorporated herein in its entirety, the above components self-assemble into a vesicle in a liquid composition.

The two blocks of the PMOXA-PDMS diblock co-polymer may be of different lengths. To obtain sufficient stability of the vesicle the PMOXA-PDMS diblock co-polymer is typically selected from the group consisting of $PMOXA_{10-40}$-$PDMS_{25-70}$ and mixtures thereof. Experiments have shown that a mixture of different PMOXA-PDMS diblock co-polymers shows higher robustness. In a preferred embodiment, the vesicles therefore comprise at least a first amphiphilic diblock copolymer of the general formula $PMOXA_{10-28}$-$PDMS_{25-70}$ and a second amphiphilic diblock copolymer of the general formula $PMOXA_{28-40}$-$PDMS_{25-70}$. The weight proportion between the first and the second amphiphilic diblock copolymer is usually in the range of 0.1:1 to 1:0.1. The concentration of amphiphilic diblock copolymer in the liquid composition is generally in the range of 0.1 to 50 mg/ml, such as 0.5 to 20 mg/ml, and preferably 1 to 10 mg/ml.

The reactive end group functionalised PDMS (reactive end group functionalized poly(dimethyl siloxane)) of the vesicle may be functionalized with one or more of amine, carboxylic acid, and/or hydroxy groups. In a certain aspect of the disclosed embodiments the reactive end group functionalised $PDMS_{e-f}$ is bis(amino alkyl), bis(hydroxyalkyl), or bis(carboxylic acid alkyl) terminated $PDMS_{e-f}$, such as poly(dimethyl siloxane), bis(3-aminopropyl) or poly(dimethyl siloxane), bis(3-hyroxypropyl). Suitably, the integer e is selected in the range of 20 to 40, such as 30 and the integer f is selected from the range of 40 to 80, such as 50. Furthermore, the reactive end group functionalised $PDMS_{e-f}$ may be selected from the group consisting of $H_2N$-$PDMS_{30-50}$, HOOC-$PDMS_{30-50}$, and HO-$PDMS_{30-50}$ and mixtures thereof. Prior to the incorporation of the vesicles with aquaporin water channels, the vesicles may be present in a liquid composition and the amount of PDMS is preferably from about 0.05% to about 1% v/v.

The vesicle of the present disclosure may further contain about 1% v/v to about 12% v/v of triblock copolymer of the $PMOXA_{a-b}$-$PDMS_{c-d}$-$PMOXA_{a-b}$ type to increase its integrity. Typically, said vesicle comprises from about 8% v/v to about 12% v/v of triblock copolymer of the $PMOXA_{a-b}$-$PDMS_{c-d}$-$PMOXA_{a-b}$ type. The triblock copolymer of the $PMOXA_{a-b}$-$PDMS_{c-d}$-$PMOXA_{a-b}$ type is typically selected from $PMOXA_{10-20}$-$PDMS_{25-70}$-$PMOXA_{10-20}$.

The vesicle of the present disclosure may further comprise a flux improving agent to increase either the water flux or decrease the reverse salt flux. The flux improving agent may be selected among a large group of compounds by is generally preferred as alkylene glycol monoalkyl ether alkylate, beta cyclodextrin, or polyethylene glycol (15)-hydroxy stearate. The flux increasing agent is usually present in an amount of 0.1% to 1% by weight of the liquid composition.

The vesicle of the present disclosure may be present in a liquid composition before immobilization in a membrane, such as a TFC layer provided on a support membrane. The liquid composition may comprise a buffer to stabilize the vesicles. Before the aquaporin water channels are mixed with the other constituents, suitably the transmembrane protein is solubilized in a detergent. The vesicles in the liquid composition may further comprise a detergent or a surfactant. The detergent may be selected from the group consisting of lauryl dimethylamine N-oxide (LDAO), octyl glucoside (OG), dodecyl maltoside (DDM) or combinations thereof.

Without wishing to be bound by any particular theory, it is believed that the vesicles containing free available reactive groups on the surface will be not only physically incorporated or immobilised in (adsorbed), but, in addition, chemically bound in the TFC layer, because the reactive free end groups, such as amino groups, hydroxyl groups and carboxyl groups, will participate in the interfacial polymerization reaction with the acyl chloride, such as a trimesoyl chloride (TMC). In this way, it is believed that vesicles will be covalently bound in the TFC layer, leading to relatively higher vesicle loading and thus higher water flux through the membranes. Furthermore, it is currently believed that the free end groups, such as amino groups or hydroxyl groups may react with carbonyl groups of the PAI to form a covalent connection between the vesicle and the support hollow fiber membrane. In addition, it is believed that the covalent coupling of vesicles in the TFC layer results in higher stability and/or longevity of the aquaporin water channels and the vesicles containing aquaporin water channels when incorporated in the selective membrane layer.

The vesicles may be prepared in a liquid composition incorporating the aquaporin water channels, comprising the step of stirring a mixture of a solution of an amphiphilic diblock copolymer of the $PMOXA_{a-b}$-$PDMS_{c-d}$ type, 0.05% to about 1% of reactive end group functionalised $PDMS_{e-f}$, and aquaporin water channels. To obtain the best result, the stirring is continued for 12-16 hours.

The preparation of a thin film composite layer immobilizing vesicles incorporating the aquaporin water channels on a porous substrate membrane comprises the steps of providing a mixture of vesicles in a liquid composition prepared as disclosed above, and a di-amine or tri-amine compound, covering the surface of a porous support membrane with the mixture, applying a hydrophobic solution comprising an acyl halide compound, and allowing the aqueous solution and the hydrophobic solution to perform an interfacial polymerization reaction to form the thin film composite layer. In a certain embodiment of the present disclosure, the hydrophobic solution further comprises a TFC layer modifying agent in an amount of 0.1 to 10% by volume. The TFC layer modifying agent has the purpose to increase the water flow and/or the rejection of solutes. In a suitable embodiment, the TFC layer modifying agent is a C3 to C8 carbonyl compound. As an example, the TFC layer modifying agent is selected among the group consisting of diethylene ketone, 2-pentanone, 5-pentanone, and/or cyclopentanone.

EXAMPLES

Example 1

1.1.1 Materials

Figure 1:
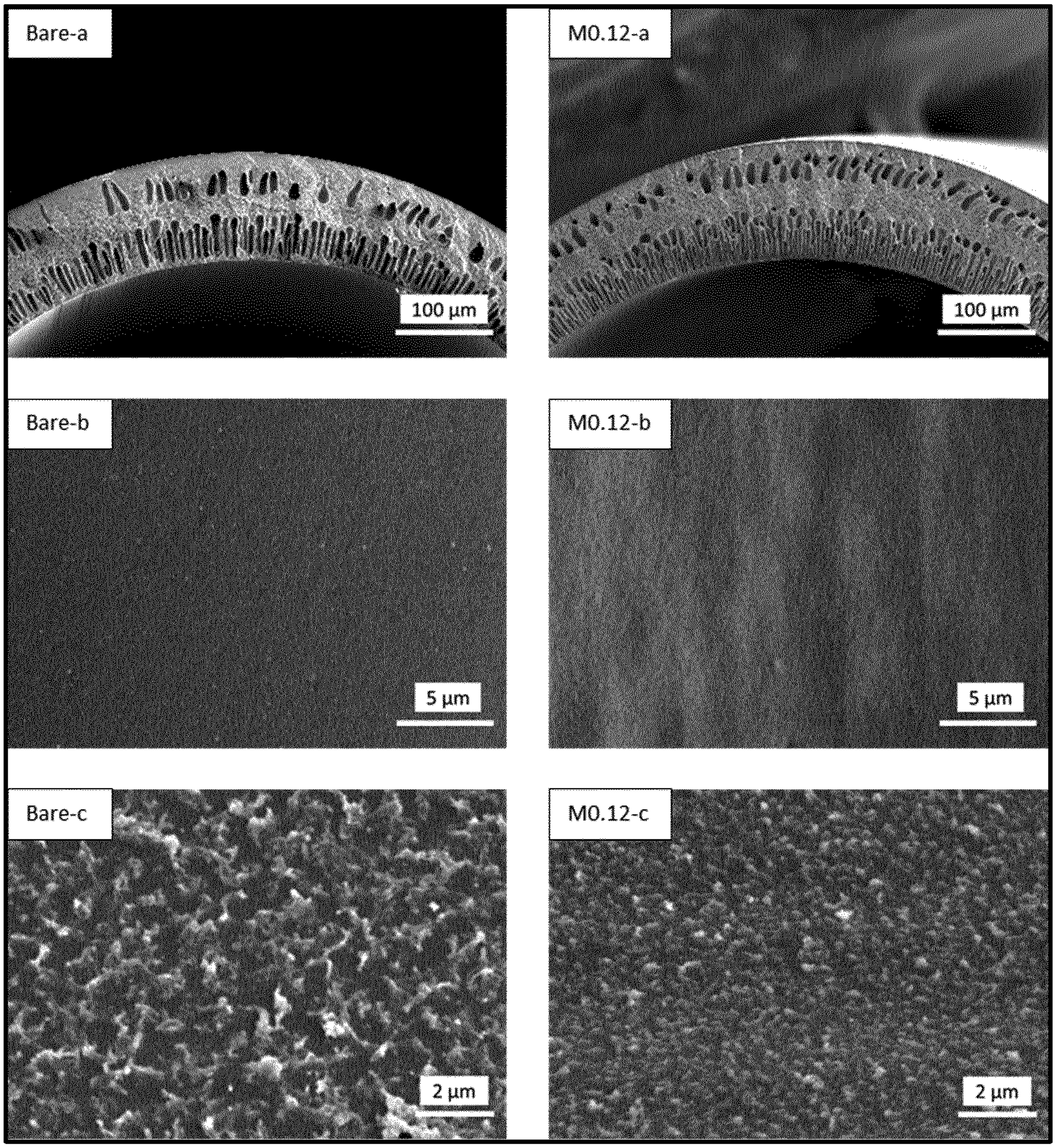
FIG. 1 shows the SEM images of Bare and M0.12 fibers, a) cross-section, b) inner surface before IP-coating, c) inner surface after IP-coating.

Polyamide-imide (PAI) Torlon® 4000TF was kindly provided by Solvay Advanced Polymers and used as base polymer for dope solution preparation. 1-Methyl-2-pyrrolidone (NMP) 99% was supplied by Acros Organics. Isopar E was kindly received from ExxonMobil Petroleum & Chemical B.V.B.A (Belgium). 1,3-Phenylenediamine (MPD) >98%, Ethylene glycol (EG), glycerol 85-87%, 1,3,5-Benzenetricarbonyl trichloride (Trimesoyl Chloride) (TMC) >98%, trisodium citrate (TSC), and polyethyleneimine (PEI, Mw~750,000 g·$mol^{-1}$ 50 wt % aqueous solution) were purchased from Sigma-Aldrich. All chemicals were used as received without further purification.

1.1.2 Fabrication of Hollow-Fibers

The dope composition, consisting of 18 wt % PAI, 13 wt % EG and 69 wt % NMP was selected after some development steps. We modified the lumen side of our hollow fibers with PEI in a one-step process during hollow fiber spinning to enhance the subsequent interfacial polymerization step.

Before the preparation of the dope solution, the base-polymer (PAI) was dried in a drying oven at 100° C. for 24 h. A roller bench was used for the preparation of both bore and dope solutions after adding all the compounds to the mixing bottles. The dope degassing was done by placing the polymer solution in the dope container of the spinning machine for 24 h. In order to investigate the effect of PEI modification, two different aqueous bore solutions, with and without PEI were utilized (Table 1).

TABLE 1.1

Bore solution composition.

| Bore solution | $H_2O$ (wt %) | NMP (wt %) | PEI (wt %) |
|---|---|---|---|
| B1 | 50 | 50 | — |
| B2 | 45 | 50 | 5 |

In total, 7 different fibers were spun using a dry-jet wet spinning technique (Table 2). The first batch was fabricated using bore solution 1 (B1) to be used as reference for further analysis (Bare), while the other six fibers were fabricated using bore solution 2 (B2) and by varying the spinning conditions to achieve different wall thicknesses. The newly-spun fibers were rinsed with deionized (DI) water for 48 h followed by immersing in 30% w/w glycerol aqueous solution for 24 h before drying.

TABLE 1.2

Spinning conditions.

| Support code | Bore sol. | Dope temp. (° C.) | Dope Flowrate (mL · min$^{-1}$) | Bore Flowrate (mL · min$^{-1}$) | Take-up speed (m · min$^{-1}$) | Air gap length (cm) | Humidity (%) | Temp. (° C.) |
|---|---|---|---|---|---|---|---|---|
| Bare | B1 | Ambient | 3.9 | 3.3 | 2.8 | 15 | 47 | 21 |
| M0.07 | B2 | Ambient | 1.8 | 2.9 | 2.1 | 15 | 47 | 21 |
| M0.09 | B2 | Ambient | 2.4 | 3.1 | 2.3 | 15 | 47 | 21 |
| M0.10 | B2 | Ambient | 3.0 | 3.2 | 2.4 | 15 | 47 | 21 |
| M0.12 | B2 | Ambient | 3.9 | 3.6 | 2.8 | 15 | 47 | 21 |
| M0.15 | B2 | Ambient | 5.0 | 3.8 | 2.8 | 15 | 47 | 21 |
| M0.17 | B2 | Ambient | 5.9 | 4.1 | 2.8 | 15 | 47 | 21 |

1.1.3 Module Preparation

00109 For the filtration experiments, each time five fibers were put inside a 10 mm perfluoroalkoxy (PFA) tubing with two QST-10 Festo push-in fittings connected to each side. Both ends were potted for 4.5 cm long with a slow curing epoxy resin to have a fiber length of 16 cm. For each type of fibers, three modules were prepared for further experiments.

1.2 Membrane Characterization 1.2.1 Scanning Electron Microscopy

The hollow fibers were first frozen in the liquid nitrogen and then fractured to prepare cross-section samples. For analyzing the lumen surface, the fibers were cut diagonally with a sharp razor blade. All samples were stored in a vacuum oven at 30° C. for 24 h. Finally, a 10 nm chromium layer was sputtered-coated on the surface of samples using a Quorum Q150T ES sputter coater. The cross-section and lumen surface image of samples were obtained by scanning electron microscope JEOL JSM-6010LA.

1.2.2 Mechanical Strength

The burst pressure of single fibers was determined by a custom setup made by Convergence Industry B.V., the Netherlands. It pushes a fluid through a hollow fiber under a continuously increasing pressure until the sample fails. This ultimate pressure is reported. For this, a single fiber membrane module was made in a similar matter as the modules used in the filtration experiments. The pressure was applied from the inside of the membrane with an increment of 0.5 bars per second. As fluid glycerol was used, as its high viscosity allows for less permeation and thus easier pressure control. Experiments were carried out at room temperature.

With the ultimate pressure, the tensile strength (δ) of the fibers were determined from Barlow's Formula, given in Eq. 2.

$$P = \frac{2\delta t}{D_{out}} \qquad (2)$$

Where P is the obtained burst pressure (bar), t is the wall thickness (mm), $D_{out}$ is the outer diameter (mm), δ is the tensile strength (bar).

1.2.3 Porosity Measurement

The porosity is measured using the known value of polyamide-imide density. The sample was firstly put in the vacuum oven for at least hour before its weight is measured. The porosity can be calculated using Eq. 3.

$$\varepsilon = \frac{V - \frac{m}{\rho}}{V} \qquad (3)$$

m is the sample mass (g), p is the PAI density (g·cm$^{-3}$), V is the volume of the fiber (cm$^{-3}$). The density of polyamide-imide used in this calculation is 1.4 g·cm$^{-3}$. Triplicate tests were performed for each type of fibers.

1.2.4 Zeta Potential Determination

The zeta potential of fibers was determined with an electrokinetic SurPASS analyzer (Anton Paar, Graz Austria) at different pHs (3-11) using 5 mM KCl as the electrolyte solution. In addition to the Bare and one-step modified fibers, an additional post-modified fiber (Post-M) with PEI was tested. For the preparation of the Post-M fiber, three bare fibers were dip-coated in a 1 wt % PEI solution at pH 5.8 for 12 h. This was done to demonstrate the surface charge of the pure PEI for comparison purposes.

For zeta potential measurement, three single fibers from each type were potted separately in 7-cm-long tubings for triplicate measurements. Two solutions of 0.1 M HCl and 0.1 M NaOH were used to automatically adjust the pH. The zeta potential was calculated using Eq. 4.

$$\zeta = \frac{dI}{dP}\frac{\eta}{\varepsilon\varepsilon_0}\frac{L_s}{A_s} \quad (4)$$

Here, ξ is the zeta potential (V), I is the streaming current (A), P is the pressure (Pa), η is the dynamic viscosity of the electrolyte solution (Pa·s), ε is the dielectric permittivity of the water, $\varepsilon_0$ is the dielectric permittivity in vacuum ($F \cdot m^{-1}$), $L_s$ is the channel length (m), and $A_s$ is the cross-section of the streaming channel ($m^2$).

1.2.5 Pure Water Permeance Measurement

The pure water permeance PWP ($L \cdot m^{-2} \cdot h^{-1} \cdot bar^{-1}$) of the fibers was determined in a dead-end, inside-out configuration at 2 bars using nitrogen pressure.

$$PWP = \frac{V}{tA\Delta P} \quad (5)$$

Here, V is the volume of collected permeate (L), t is the collecting time (h), A is the membrane inner surface area ($m^2$), and ΔP is the pressure difference between the lumen and the shell of the hollow fibers (bar).

1.2.6 Interfacial Polymerization

The interfacial polymerization (IP) was performed at the inner surface of the fibers using MPD and TMC to form a polyamide (PA) selective layer. To achieve sufficient wetting and removing glycerol from fibers, the modules were immersed in DI water overnight prior to the IP reaction. A 2.5% (w/v) MPD aqueous solution and a 0.15% (w/v) TMC solution were utilized for IP-coating. The TMC was dissolved in isopar E using an ultrasonic bath (20° C., 2 min).

At first, excess water on the shell and in the lumen of the hollow fibers was removed by $N_2$-flow for 1.5 min. MPD solution was then fed into the lumen side of the vertically-fixed fibers (5 fibers) by using a syringe pump at 10 $L \cdot min^{-1}$ for 2 min. Then, the MPD solution was kept inside the fiber for 10 min in a horizontal position followed by the removal of excess MPD by $N_2$-flow for 1 min. Subsequently, the TMC solution was introduced into the vertically-fixed fibers by using a syringe pump at 10 $L \cdot min^{-1}$ for two times 15 s with an interval of 45 s. Next, residual TMC was removed by $N_2$-flow for 30 s followed by drying in an air oven at 70° C. for 10 min. Finally, the lumen of the fibers was rinsed with 20 ml of DI water and the modules were kept in DI water at 7° C. until further use.

1.2.7 Salt Rejection

The salt rejection of the coated fibers with 500 $mg \cdot L^{-1}$ NaCl and TSC solutions was determined in an inside-out cross-flow filtration system at a transmembrane pressure of 2 bars. The cross-flow velocity in each fiber was set to 1.7 $m \cdot s^{-1}$. The rejection was determined by measuring the conductivity of the feed solution and collected permeate and then calculated as follows:

$$R = \frac{(\sigma_f - \sigma_p)}{\sigma_f} \times 100\% \quad (6)$$

In this equation, R is salt rejection percentage (%), $\sigma_f$ is the conductivity of feed solution ($\mu S \cdot cm^{-1}$), and $\sigma_p$ is the conductivity of permeate solution ($\mu S \cdot cm^{-1}$).

The salt permeance (B) were determined with $J_w$ ($L \cdot m^{-2} \cdot h^{-1}$) the water flux and a mass transfer coefficient (K) ($L \cdot m^{-2} \cdot h^{-1}$) according to the Lévêque correlation for a fully developed laminar velocity profile in a tube.

$$B = J_w\left(\frac{1-R}{R}\right)\exp\left(-\frac{J_w}{K}\right) \quad (7)$$

1.2.8 FO Performance

The osmotic performance of the fibers was evaluated in the selective layer facing the feed (FO) mode. The tests were conducted in counter-current configuration using 1 M NaCl or 1 M TSC as draw solutions at a cross-flow rate of 3 $L \cdot h^{-1}$ per module (corresponding to the velocity of 2 $m \cdot s^{-1}$ in the lumen). The experiment was carried out for 1 h where the water flux ($J_w$) ($L \cdot m^{-2} \cdot h^{-1}$) was determined by measuring the water transferred from the feed solution to the draw solution per membrane area per time. The reverse salt flux ($J_s$) ($g \cdot m^{-2} \cdot h^{-1}$) was determined by measuring the feed solution conductivity increase per membrane area per time. The amount of solute passing to the feed side was measured using a pre-determined calibration curve.

Due to difficulties in measuring tortuosity, the structural parameter (S) was estimated by a fitting method, which for FO mode can be written as (Eq. 8):

$$S = \frac{D}{J_w}\ln\frac{B + A\pi_D}{B + J_w + A\pi_F} \quad (8)$$

Here, $J_W$ ($L \cdot m^{-2} \cdot h^{-1}$) is the osmotic water flow, D ($m^2 \cdot h^{-1}$) is the solute diffusivity, $\pi_D$ (bar) is the osmotic pressure of the draw solution, A is the water permeance ($L \cdot m^{-2} \cdot h^{-1} \cdot bar^{-1}$), and B is the salt permeability coefficient ($L \cdot m^{-2} \cdot h^{-1}$) as determined with Eq. 7.

For all results presented the errors presented are the obtained standard deviation of the measurements.

1.3 Results and Discussion 1.3.1 Hollow-Fiber Dimension and Porosity

The thicknesses, inner diameters, and porosities of the spun fibers can be found in Table 3. The wall thickness of the fibers varied in the range of 0.07-0.17 mm. The measured porosity of the single-step modified fibers was in the range of 75-77%. Based on Eq.1, a 2% variation in porosity results in 2% change in the S parameter while the wall thickness difference used in this study (0.07-0.17 mm) can influence the S parameter by 143%. This brings us to the conclusion that the influence of the porosity in this study is very minor as compared with the wall thickness and can be neglected. In addition, we analyzed the effect of the porosity of these fibers on the S parameter (determined by Eq. 7) and no true correlations can be found in the (data not reported here).

TABLE 1.3

The dimension and porosity measured for spun hollow fiber supports, n = 3, determined by the dimension tool of the SEM.

| | ID (mm) | Wall thickness (mm) | Porosity (%) |
|---|---|---|---|
| Bare | 0.78 ± 0.01 | 0.12 ± 0.01 | 78.3 ± 0.7 |
| M0.07 | 0.85 ± 0.01 | 0.07 ± 0.01 | 75.0 ± 1.0 |
| M0.09 | 0.83 ± 0.01 | 0.09 ± 0.01 | 75.4 ± 0.3 |
| M0.10 | 0.83 ± 0.01 | 0.10 ± 0.01 | 76.5 ± 0.4 |
| M0.12 | 0.82 ± 0.01 | 0.12 ± 0.01 | 76.1 ± 0.5 |
| M0.15 | 0.85 ± 0.01 | 0.15 ± 0.01 | 75.9 ± 0.4 |
| M0.17 | 0.86 ± 0.01 | 0.17 ± 0.01 | 76.8 ± 0.8 |

1.3.2 Hollow-Fiber Morphology

For illustrative purposes, the SEM images of Bare and M0.12 fibers were chosen to be shown in this section because of their similar wall thicknesses. The cross-section image and inner surface images before and after IP-coating can be seen in FIG. 1. The cross-sectional images of the Bare and M0.12 fibers show a similar morphology. They consist of a finger-like structure stretched from the middle to the lumen side with having a few macrovoids located next to the shell side. This shows that the addition of the PEI to the bore solution had no effect on the whole structure of the HF support, hence similar tortuosity is expected for the fibers. This is advantageous as the whole structure of the support can be further improved independently to meet certain requirements while keeping the inner surface unchanged. Still, the inner surface of the modified fibers (image M0.12-b) exhibits a slightly different structure than the bare fibers (image Bare-b). In fact, it appears smoother as compared with the lumen surface of the Bare fibers. Similar structures can be observed for the inner surfaces of other modified fibers with different thicknesses (FIG. A3). This similarity in the inner surface images of all modified fibers shows that the modification of the inner surface by PEI was reproducible regardless of changes in the thickness of the support. This is important because in order to solely focus on the support thickness, the bore surface should be similar as IP is known to be sensitive to the physicochemical properties of the support surface such as porosity, pore size, and hydrophilicity.

The SEM images of the inner surface after IP clearly show the existence of the polyamide layer, but with arguably different morphologies (Bare-c and M0.12-c images) which can be attributed to the surface modification by PEI. The addition of PEI led to a smoother lumen surface, which results in thinner PA layers. This makes the reaction happening mostly inside the pores rather than at the surface, while the opposite happens for the Bare fibers. For the Bare fibers, the MPD solution can more easily diffuse out of the surface pores during the IP process, resulting in having the interface between MPD and TMC mostly at the surface. This led to a more pronounced ridge-and-valley PA layer for bare fiber (Bare-c). The same PA structure was observed for the other PEI modified fibers with various thicknesses (data not reported here), which again indicates the inner surface of the modified fibers remained consistent even though the wall thickness had been altered.

1.3.3 Mechanical Strength

Figure 2:
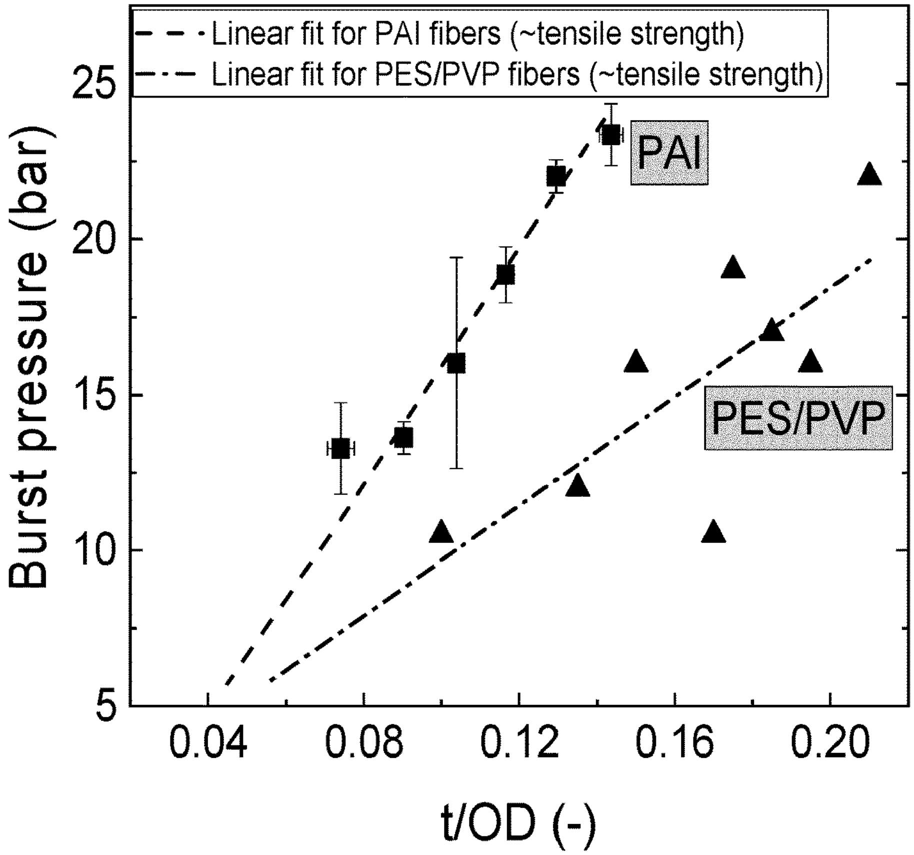
FIG. 2 shows the burst pressure of fiber supports versus normalized wall thickness (t) by OD (outer diameter), n=5.

The burst pressures of the modified fibers are plotted versus their thickness normalized with outer diameter (OD) (FIG. 2). As expected from Eq. 2 (Barlow's formula), a clear upward trend was observed in the burst pressure of fibers by increasing the wall thickness. This finding also shows that lowering the wall thickness in order to improve the osmotic water flux comes with sacrificing the support's mechanical strength. Still, a high burst pressure of 13±1.5 bar was found for the thinnest fiber with a wall thickness of 0.07 mm, which is attributed to the high tensile strength of the PAL. We argue that a burst pressure of 10 bars will suffice for membranes used for FO, similar to the burst pressure of commercial ultrafiltration membrane where operating pressures typically are below 1 bar. Hence, all or membranes are mechanically suited to be used in FO processes.

Additionally, the burst pressure of PAI fibers are compared to commercial PES/PVP ultra- and microfiltration fibers from NX Filtration B.V. (FIG. 2). As can already be estimated from higher tensile strength of PAI (>147 MPa) as compared with PES (<90 MPa), the result of the burst pressure also proved that at a similar wall thickness, the PAI fibers showed a substantially higher burst pressure. These results highlight that in FO membrane support design it is important to on forehand select the appropriate polymer properties that will allow for a suitable fiber. Especially when aiming for a low structural parameter by lowering the thickness, proper polymer selection becomes crucial.

1.3.4 Zeta Potential of the Hollow-Fiber Supports (Pre-IP)

Figure 3:
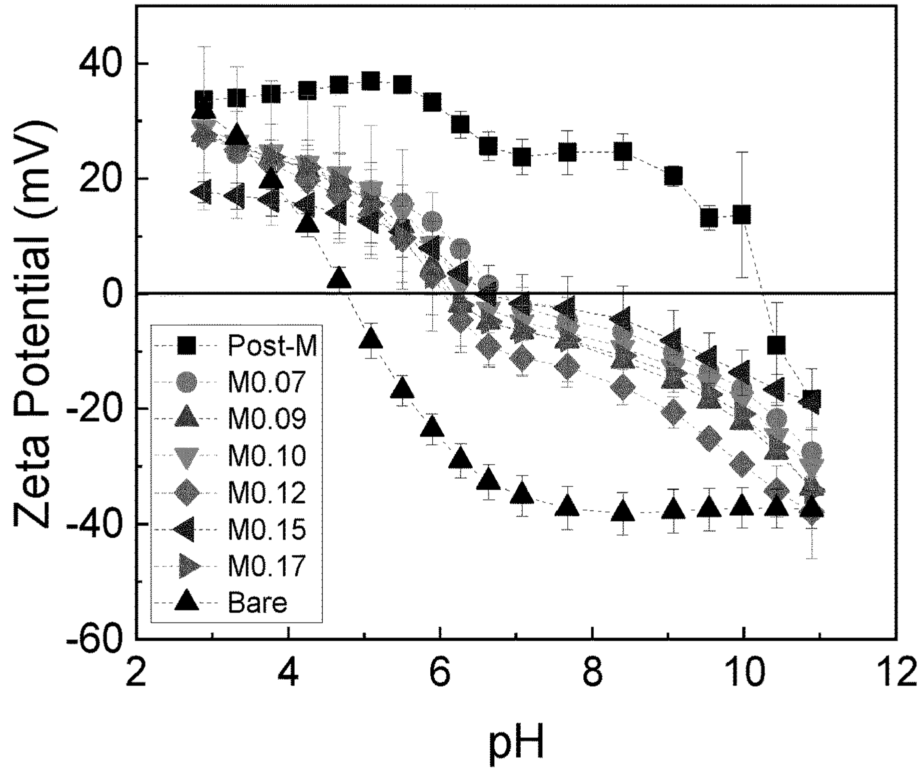
FIG. 3 shows the Zeta potential of the hollow fiber supports as a function of pH, (bars represent the standard deviation of 3 fibers, with 6 measurements for each).

The zeta potential of all fibers before applying an IP layer as a function of pH is plotted in FIG. 3. For better visualization, the zeta potential of modified fibers is shown in color and the bare fibers in black. For the modified fibers almost the same trend in zeta potential was observed. They possessed a more positive zeta potential profile as compared to the Bare fibers. This difference clearly gives an indication of a successful modifying of the inner surface with the positively-charged PEI. However, the zeta potential of the modified fibers does not fully reflect zeta potential as expected from PEI alone. To better understand this, the zeta potential of the bare fibers post-modified by PEI (referred to as Post-M) is added to the plot. When comparing the surface charge of the Post-M fiber with that of the single-step modified fiber, the difference in their zeta potential becomes evident. The Post-M fibers showed a positive charge for almost the whole pH range with an isoelectric point at a pH above 10, consistent with the pKa of PEI. In contrast, the zeta potential of the fibers modified during spinning clearly shows a lower isoelectric point. This difference between single-step modified and post-modified fibers in zeta potential shows that the PAI support has also contributed to the final surface charge of the single-step modified fibers. The notable contribution of the PAI support to the surface charge indicates that the PEI added to the membrane via the bore liquid is integrated into the support due to the single-step preparation.

1.3.5 Pure Water Permeance (PWP) and Salt Rejection

Figure 4:
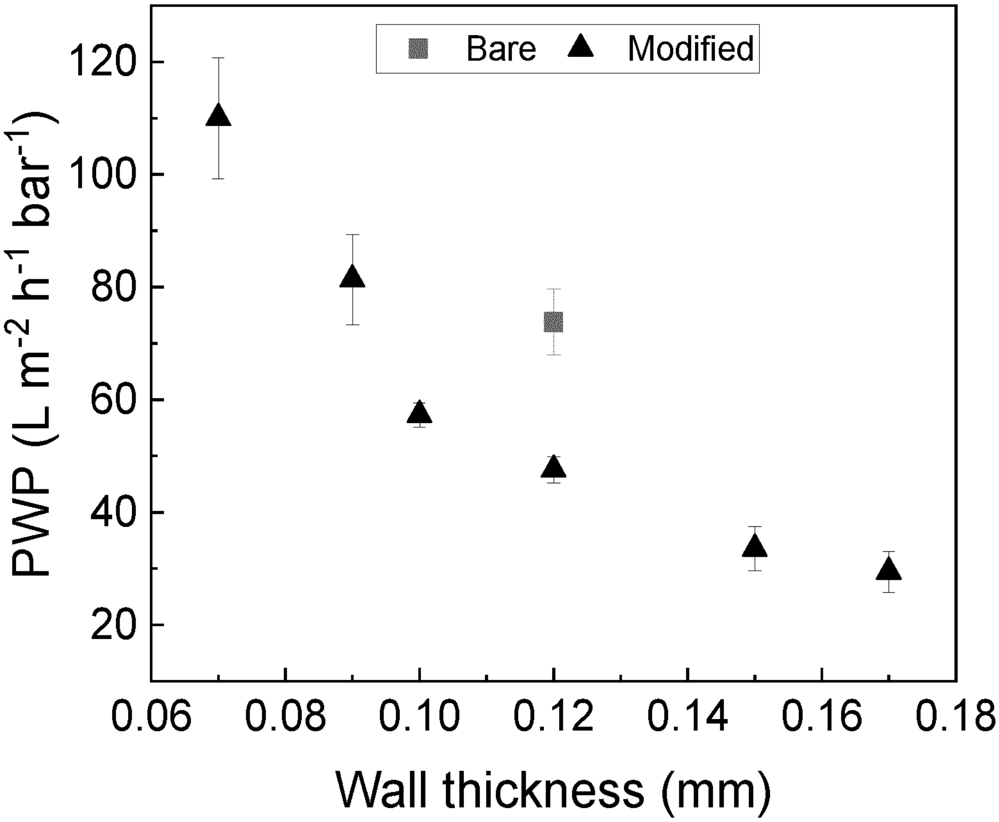
FIG. 4 shows the pure water permeance of the fiber supports (before IP-coating), n=3.

The pure water permeance of the fiber support was measured before IP-coating (FIG. 4). Notably, a decreasing trend was observed in the pure water permeance when the wall thickness of the modified fibers was increased. This shows that the thickness has a clear effect on the mass transport resistance through the support as the lowest thickness showed the highest water permeance (lowest resistance). Particularly, a lower resistance of the mass transport is favorable for mitigating ICP occurring inside the support in the FO process. This is because low resistance leads to high movement of the draw solutes in the support and compensates for the ICP.

A higher PWP was recorded for the bare fiber as compared with the modified fiber with a similar thickness (M0.12). Despite the minor difference in their porosities (78.3% for bare and 76.1% for M0.12), the higher PWP of the bare fiber is predominantly attributed to the lack of the PEI modification. The M0.12 fiber clearly possesses an extra resistance towards water transport due to the additional PEI, effectively narrow the pores. Evidently, the higher flux of the bare support is not attributed to its higher porosity (78.3%) as compared with the M0.12 (76.1%) as no correlation between the porosity and PWP became evident. This further proves the substantial influence of the wall thickness on the mass transport inside the HF supports.

Figure 5A:
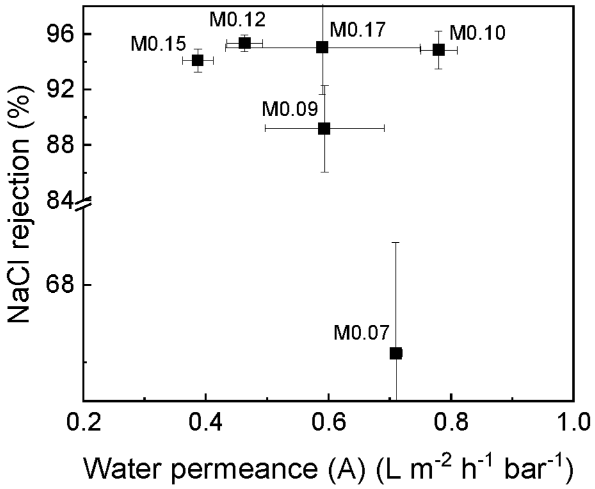
FIG. 5 shows in 5A: The NaCl rejection as a function of water permeance (A), and in 5B: The TSC rejection as a function of (A), n=3.
Figure 5B:
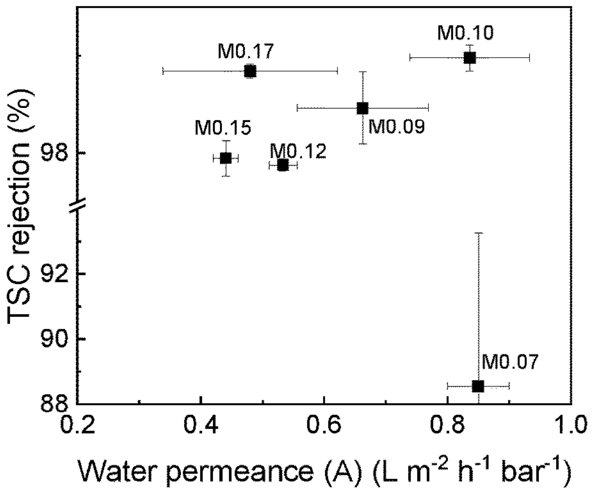

The NaCl and TSC rejections of the modified fibers after IP-coating were measured in RO mode and are plotted versus their water permeance (A) in FIG. 5A and FIG. 5B, respectively. The first notable observation was that the IP-coated fibers generally showed better rejection towards TSC than NaCl which can be attributed to the solutes size difference. Secondly, in both cases, the thinner fiber (M0.07) showed lower rejections which can be due to layer defects attributed to its low thickness. The low wall thickness of M0.07 probably does not provide sufficient reservoir for IP-coating thus not enough monomer is available to take part in the reaction to obtain a defect free layer for the IP protocol we used. This can be overcome by optimization of the IP-coating technique in order to improve the rejection for such thin hollow fiber support. Therefore, the lower rejection for M0.07 can be attributed to defects in the selective layer. Finally, except for the M0.07 fibers, the remaining modified fibers showed high rejections for NaCl and TSC, >88% and >97% respectively. These high rejections prove the high success rate of the IP-coating and existence of a defect-free PA layer which is a prerequisite for FO membranes.

It is worth to mention that no correlation was found between the wall thickness and the selective layer's water permeance (A) of the modified fibers after IP-coating. This indicates that the properties of the PA selective layer formed on all fibers are independent of their wall thickness. This identical PA selective layer on all modified fibers is actually favorable because this will ultimately limit the focus on the effect of the support's wall thickness on the FO performance.

In addition, a water permeance (A) of <1 ($L \cdot m^{-2} \cdot h^{-1} \cdot bar^{-1}$) was gained for all the membranes with different wall thicknesses and put the membranes in the A-limited regime. It means that the FO performance (osmotic water flux) is influenced by both the selective layer and the support layer. It is thus expected that with further optimization of the IP protocol, the FO performance can be improved substantially.

1.3.6 FO Performance

Figure 6A:
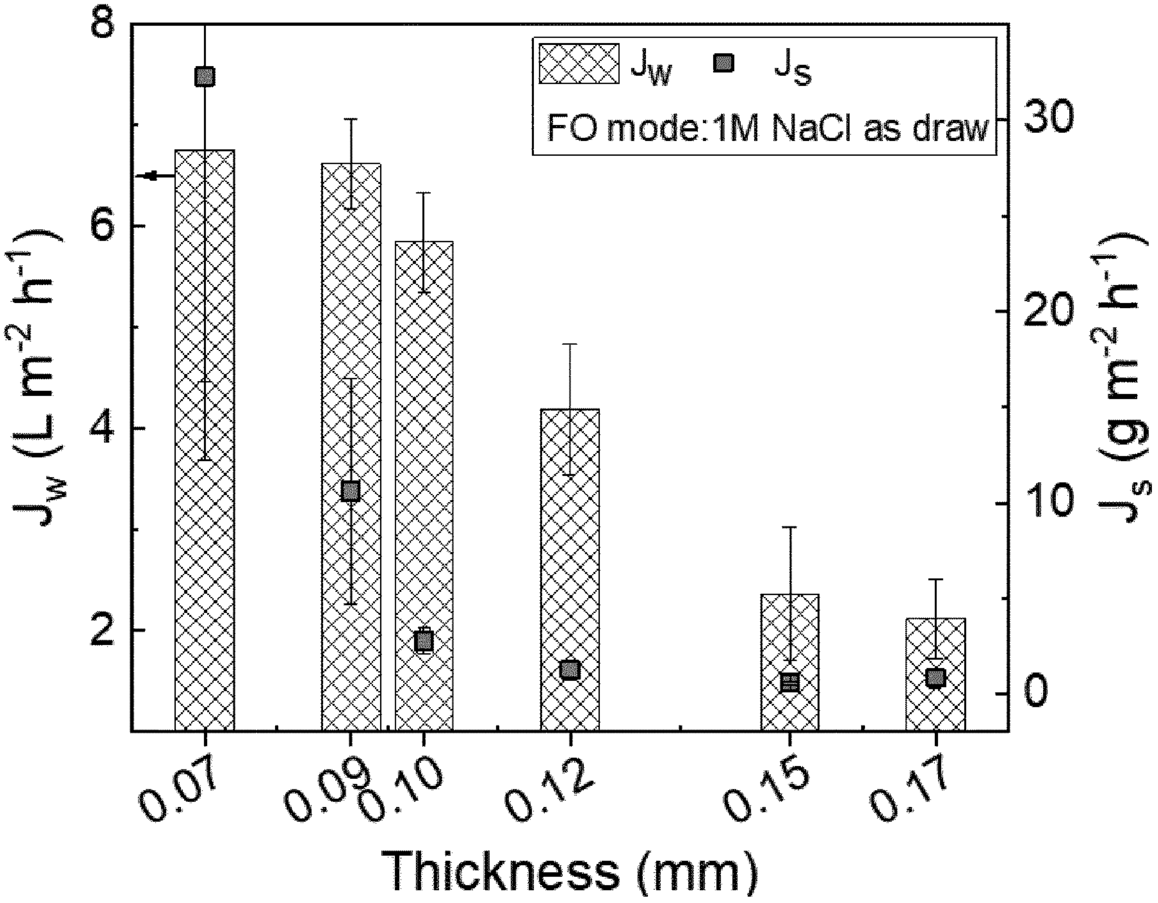
FIG. 6 shows in 6A: The water flux (Jw) and reverse salt flux (Js) measured in FO mode using DI water as feed solution and 1M NaCl as draw solution; 6B: The water flux (Jw) and reverse salt flux (Js) measured in FO mode using DI water as feed solution and 1M TSC as draw solution, n=3.
Figure 6B:
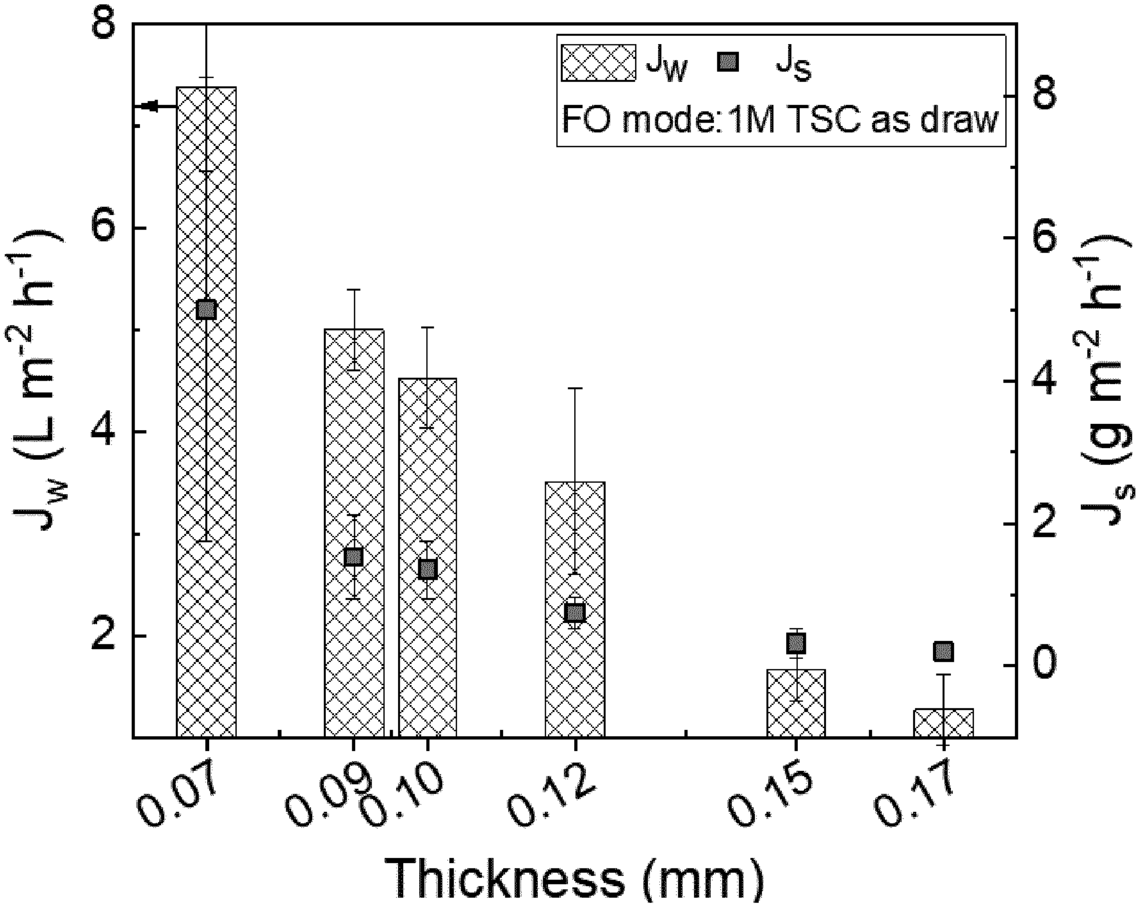

To investigate the role of the wall thickness, the IP-coated modified fibers were tested in FO mode. The osmotic water flux (Jw) and reverse salt flux ($J_s$) are plotted as a function of the wall thickness in FIG. 6. The osmotic water fluxes achieved for our FO membranes are lower than the typical-values reported for FO membranes, which is mostly due to their low A values. The A value can be indeed improved to values above 1 ($L \cdot m^{-2} \cdot h^{-1} \cdot bar^{-1}$) by optimizing the IP coating procedure which was not the aim of this study. However, even though partially influenced by the A value, the effect of wall thickness on the ICP (S parameter) is already apparent and could be even more pronounced if the A values were higher than 1 ($L \cdot m^{-2} \cdot h^{-1} \cdot bar^{-1}$). It can be seen that by decreasing the wall thickness the osmotic water flux was increased. This trend was expected theoretically from Eq. 1 in which a thinner support should result in a lower ICP and consequently a higher osmotic water flux. The increasing trend was visible for both draw solutions with only one exception for M0.07 when 1 M NaCl used. The reason for this poorer result of M0.07 was its lower rejection against NaCl (66±3%) which leads to higher reverse salt flux in FO process.

In addition to Jw, the reverse salt flux (Js) also showed an increasing trend when lowering the wall thickness. While a high $J_s$ is unfavorable for the FO process due to loss of driving force, our modified fibers showed acceptable reverse salt fluxes, except for the M0.07. However, this could be resolved by IP-coating optimization which would, in the end, allows to properly coat the thinner supports as well.

Figure 7A:
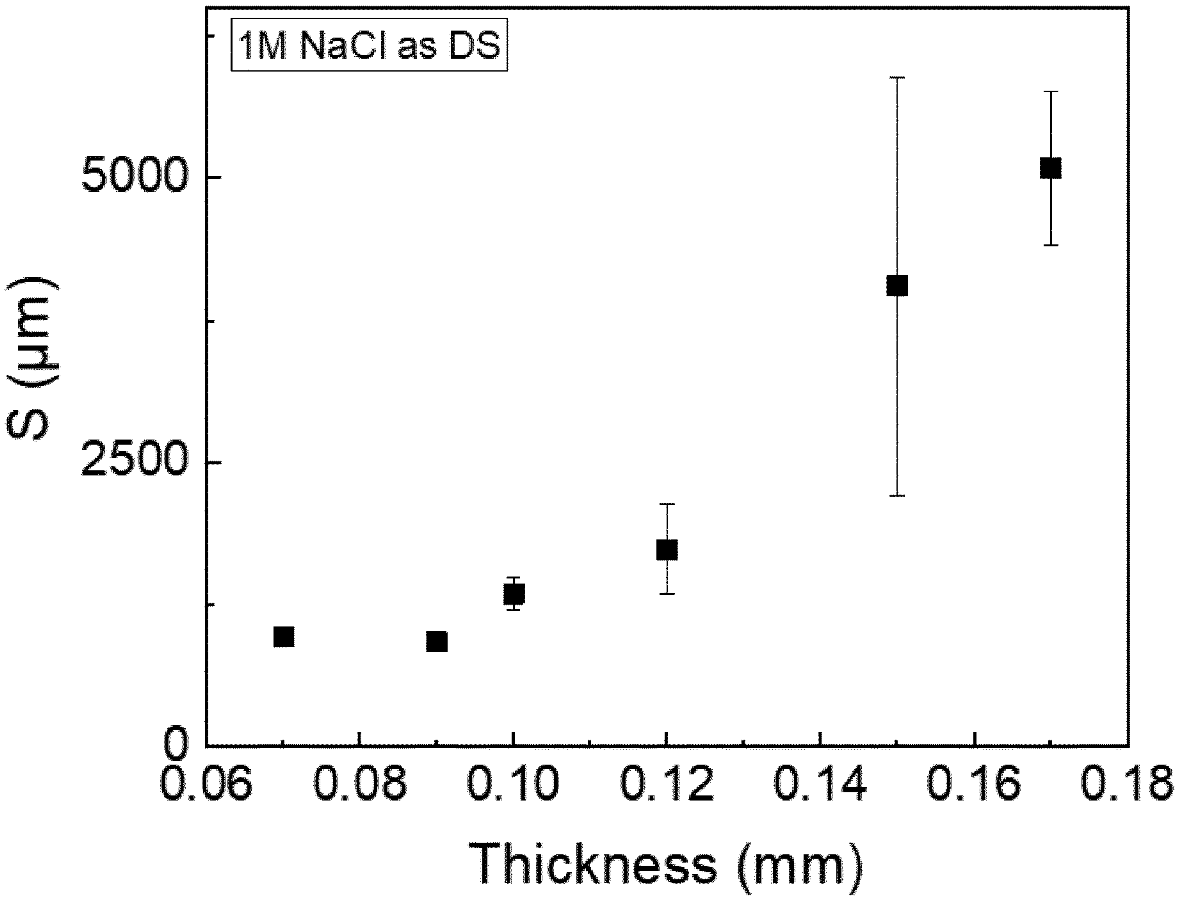
FIG. 7 shows the S parameter measured in FO mode and calculated by Eq. 5, 7A: 1 M NaCl and 7B: 1 M TSC, n=3.
Figure 7B:
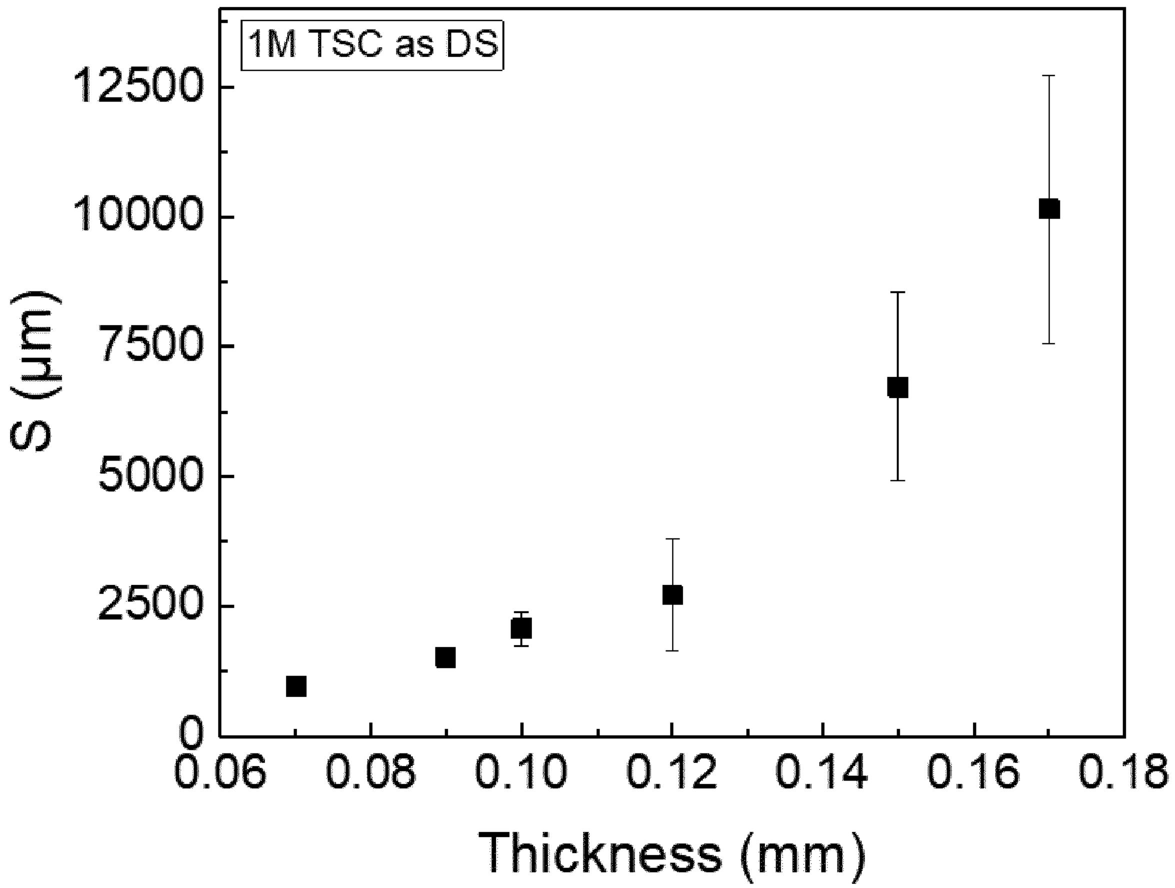

Likewise, the measured S parameter, as determined by the empirical method (Eq. 8), showed the same trend. For both draw solutions, the S parameter increased with increasing the wall thickness (FIG. 7). In general, lower S parameters were obtained when NaCl was used as draw solution compared with TSC. Haese et al. [44] found that the S grows with increasing the draw solute ion valence (in our case NaCl as compared with TSC). This finding indicates that the S parameter of support is not only dependent on its physical properties (tortuosity, porosity, and thickness), but it is also affected by other parameters such as draw solute properties. On the other hand, this finding of determining two different S parameters for one and the same support could be due to the inaccuracy of the fitting equation (Eq. 8) for the estimation of the ICP. The inaccuracy of the existing structural parameter model (Eq. 8) has been discussed before [2,45]. Regardless of these challenges, the results presented here clearly show the importance of the thickness of the support for FO membranes and that by selecting the appropriate polymer supports with a very low thickness can be made that still have the necessary mechanical strength needed for industrial applications.

1.4 Conclusion

In this study, the influence of hollow fiber wall thickness on the membrane performance in Forward Osmosis (FO) mode was systematically investigated. The inner surface of the supports simultaneously was modified with PEI during spinning to better allow for a subsequent IP coating. After interfacial polymerization, the membranes exhibited a high rejection towards both NaCl and TSC, typical solutes in FO processes. In order to ensure membrane integrity when applied in FO processes, the mechanical strength of the hollow fiber was an important aspect in the design of the membrane. By selecting PAI, a high tensile strength polymer, we were able to fabricate very thin hollow fiber membranes while keeping the burst pressure well above 10 bars for all the membranes. This is more than sufficient for FO applications. We also showed correlations between the fiber geometry, polymer tensile strength and the burst pressure of the nascent fiber.

By decreasing the wall thickness the osmotic water flux significantly increased from 1.2±0.4 to 7±1 ($L \cdot m^{-2} \cdot h^{-1}$) and from 2±0.4 to 7±2 ($L \cdot m^{-2} \cdot h^{-1}$) when 1 M TSC and 1 M NaCl were used as draw, respectively. The relatively low water flux, even for the thinnest fibers, can be attributed to low water permeance (A) of the membranes after IP. It is expected that by further optimization of the IP and thus increasing the water permeance even higher fluxes can be obtained.

Our results show that by using a suitable polymer and by lowering the wall thickness of the support, the osmotic water flux can be improved significantly without compromising the mechanical strengths. As such, these types of thin hollow fiber supports are a promising alternative to the thick RO-type supports that have been usually used for FO membranes.

Example 2

2.1.1 Materials

Polyamide-imide (PAI) Torlon® 4000TF was kindly received from Solvay Advanced Polymers and utilized as the base polymer for dope solution preparation. Branched polyethyleneimine (PEI) with three different molecular weights (PEI 750 k: Mw~750,000 $g \cdot mol^{-1}$ 50 wt % solution; PEI 25 k: MW~25,000 $g \cdot mol^{-1}$ pure solution; and PEI 2 k: MW~2,000 $g \cdot mol^{-1}$ 50 wt % solution) were utilized in bore liquid for the single-step modifying of PAI hollow fiber supports. 1-Methyl-2-pyrrolidinone (NMP) 99% was purchased from Acros Organics. Isopar E was kindly supplied by ExxonMobil Petroleum & Chemical B.V.B.A. (Belgium). 1,3-Phenylenediamine (MPD)>98%, Ethylene glycol (EG), glycerol 85-87%, and 1,3,5-Benzenetricarbonyl trichloride (TMC)>98% were purchased from Sigma-Aldrich. All chemicals were used as received without further purification.

2.1.2 Fabrication of Hollow-Fibers

The dope composition consisted of 15 wt % PAI, 16 wt % EG, and 69 wt % NMP and was adapted from our dope recipe used in example 1, which constitutes to 17% less polymer overall or a 3 wt % reduction in PAI content in the dope. Prior to dope solution preparation, the base-polymer (PAI) was dried in an oven at 100° C. for 24 h. Both bore solutions and polymer solutions (dope) were prepared on a roller bench after adding all the compounds to the bottles. Dope degassing was done by placing the polymer solution in the dope container of the spinning machine for 24 h. The fibers were spun using the dry-jet wet phase inversion spinning process.

Torlon (PAI) was selected because of its excellent mechanical properties and the possibility of interacting with PEI, which results in fibers with high burst pressure and proper adhesion of the PEI to the support, respectively. We performed the PEI-modification to facilitate the application of subsequent interfacial polymerization, by adding amine to the inner surface of the support.

In order to investigate the success of PEI-modification, a bore solution without PEI was used in addition to the bores containing PEI with different molecular weights (Table 1). In total, four different types of fibers were spun in this study (Table 2). The first batch was fabricated using bore B1 to be used as a reference for further analysis (Unmodified), while the other three fibers were fabricated using bores containing one of the different PEIs (B2, B3 or B4).

TABLE 2.4

Bore compositions used in the spinning processes described in this work.

| Bore solution | $H_2O$ (wt %) | NMP (wt %) | PEI 2k (wt %) | PEI 25k (wt %) | PEI 750k (wt %) |
|---|---|---|---|---|---|
| B1 | 50 | 50 | — | — | — |
| B2 | 45 | 50 | 5 | — | — |
| B3 | 45 | 50 | — | 5 | — |
| B4 | 45 | 50 | — | — | 5 |

The nascent fibers then were rinsed for 72 h in deionized (DI) water whereafter they were post-treated for 24 h by immersing them in 30% w/w glycerol solution to preserve the pores during drying. Finally, the fibers were hung to be dried at room temperature until further use.

TABLE 2.5

Spinning conditions for manufacturing the four nascent fibers.

| Support code | Bore sol. | Dope temp (° C.) | Dope Flowrate (mL · $min^{-1}$) | Bore Flowrate (mL · $min^{-1}$) | Take-up speed (m · $min^{-1}$) | Air gap length (cm) | Humidity (%) | Temp. (° C.) |
|---|---|---|---|---|---|---|---|---|
| Unmodified | B1 | Ambient | 4.5 | 3.3 | 2.4 | 11 | 65 | 22 |
| 2K | B2 | Ambient | 4.5 | 3.3 | 2.5 | 11 | 65 | 22 |
| 25K | B3 | Ambient | 4.5 | 3.4 | 2.6 | 11 | 56 | 21 |
| 750K | B4 | Ambient | 4.5 | 3.3 | 2.5 | 11 | 65 | 22 |

The newly spun fiber (fiber 750K) is compared with a fiber spun with 3 wt % more polymer in its dope recipe (namely M0.12) and its surface modified with 5 wt % PEI 750 k.

2.1.3 Module Preparation

Five fibers were put inside one 10 mm perfluoroalkoxy (PFA) tubing with two QST-10 Festo push-in fittings connected to each side. Both ends were potted for 4.5 cm long with a slow curing resin (BISON, 2K Expert Polyurethane) to have a fiber length of 16 cm. For each type of fiber, three to four modules were prepared for further experiments. All filtration experiments were run in at least triplicate using separate modules.

2.2 Membrane Characterization 2.2.1 Scanning Electron Microscopy

The hollow fibers were frozen and fractured in the liquid nitrogen to prepare cross-section samples for imaging. For the preparation of the inner surface sample, the fibers were cut diagonally in half with a sharp razor blade. All samples were mounted on designated holders and stored in a vacuum oven at 30° C. for 24 h. Finally, samples were sputter-coated by a 5 nm platinum layer using Quorum Q150T ES coater, before microscopy was carried out using a JEOL JSM-6010LA SEM.

2.2.2 Contact Angle Measurements

The water contact angle of the inner surface was measured to investigate the influence of PEI-modification on the hydrophilicity of the support's surface. For this, the hollow fiber support was cut open and mounted on a double-sided tape so that the inner surface could be exposed to the micro-syringe of the analyzer (FIG. 1). A Di water droplet of 0.5 μL was placed onto the inner surface. The contact angle of the drop was recorded after 3 s and analyzed by the software. Measurements were repeated three times at three different spots for each support 2.2.3 Mechanical Strength The burst pressure of single fibers was determined by a custom setup made by Convergence Industry B.V., the Netherlands. It pushes a fluid through a hollow fiber under a continuously increasing pressure until the sample fails. This ultimate pressure is reported. For this, a single fiber membrane module was made in a similar matter as the modules used in the filtration experiments. The pressure was applied from the inside of the membrane with an increment of 0.5 bars per second. As fluid glycerol was used, as its high viscosity allows for less permeation and thus easier pressure control. Experiments were carried out at room temperature.

With the ultimate pressure, the tensile strength (δ) of the fibers were determined from Barlow's Formula, given in Eq. 1.

$$P = \frac{2\delta t}{D_{out}} \tag{1}$$

Where P is the obtained burst pressure (bar), t is the wall thickness (mm), Dout is the outer diameter (mm), 5 is the tensile strength (bar).

2.2.4 Porosity Measurement

The fibers were first rinsed for 20 min in an inside-out configuration and kept in vacuum oven at 30° C. for at least 4 h before the test. The porosity is measured using the known value of polyamide-imide density. The sample was firstly put in the vacuum oven for at least 1 hour before its weight is measured. The porosity can be calculated using Eq. 2.

$$\varepsilon = \frac{V - \frac{m}{\rho}}{V} \tag{2}$$

m is the sample mass (g), p is the PAI density (g·cm−3), V is the volume of the fiber ($cm^{-3}$). The density of polyamide-imide used in this calculation is 1.4 $g \cdot cm^{-3}$. Triplicate tests were performed for each type of fibers.

2.2.5 Zeta Potential Determination

The zeta potential of fibers was determined with a SurPASS electrokinetic analyzer (Anton Paar, Graz Austria) at pHs (3-11) utilizing 5 mM KCl as the electrolyte solution. For this, two single fibers from each type were potted separately in 7-cm-long tubing. The zeta potential was determined by flowing the electrolyte solution inside the lumen of the fibers and was measured six times for each pH set value for each fiber. The zeta potential value was then determined by averaging all 12 measurements at each pH. The pH was adjusted by automatic titration using 0.1 M HCl and 0.1 M NaOH. The zeta potential was calculated using Eq. 3.

$$\zeta = \frac{dI}{dP} \frac{\eta}{\varepsilon\varepsilon_0} \frac{L_s}{A_s} \tag{3}$$

In this equation, ξ is the zeta potential (V), I is the streaming current (A), P is the pressure (Pa), η is the dynamic viscosity of the electrolyte solution (Pa·s), ε is the dielectric permittivity of the water, $\varepsilon_0$ is the dielectric permittivity in vacuum (F·m−1), $L_s$ is the channel length (m), and $A_s$ is the cross-section of the streaming channel ($m^2$).

2.2.6 Pure Water Permeance Measurement

The pure water permeance (PWP) (A) ($L \cdot m^{-2} \cdot h^{-1} \cdot bar^{-1}$) of the fibers was measured in dead-end, inside-out mode at 1 bar using compressed nitrogen.

$$A = \frac{V}{tA\Delta P} \tag{4}$$

where V is the volume of the collected permeate (L), t is the collecting time (h), A is the membrane inner surface area ($m^2$), and ΔP is the pressure difference between the lumen and the shell of the hollow fibers (bar).

2.2.7 Interfacial Polymerization

The inner surface of the fibers was coated by the interfacial polymerization technique using MPD and TMC to form the polyamide (PA) selective layer. Prior to the reaction, all fiber modules were run in the PWP test in a dead-end, inside-out mode at 1 bar to remove the glycerol from the fibers. A 2.5% (w/v) MPD solution was prepared by dissolving the desired amount of MPD in DI water. The TMC was dissolved in Isopar E using an ultrasonic bath (20° C., 2 min) to obtain a 0.15% (w/v) TMC solution.

Firstly, excess water in the lumen and on the shell side of hollow fiber was removed by N2-flow for 1.5 min. MPD solution was then flown into the lumen side of the vertically-fixed fiber by a syringe pump at 10 L·min−1 for 2 min. Next, the solution was kept inside the fiber for 10 min in a horizontal position followed by the removal of excess MPD by N2-flow for 1 min. Subsequently, the TMC solution was fed into the vertically-fixed fiber by using a syringe pump at 10 L·min−1 for two 15 s, with an interval of 45 s. Afterward, the residual TMC was removed by N2-flow for 30 s followed by drying in an air oven at 70° C. for 10 min. Finally, the lumen of fibers was rinsed with 20 ml of DI water and the modules were kept in DI water at 7° C. for further use.

2.2.8 Salt Rejection

The fibers' rejection towards 500 mg·L$^{-1}$ NaCl solution was determined in a cross-flow filtration system at a trans-membrane pressure (TMP) of 2 bars. The rejection was calculated using Eq. 5 by measuring the conductivity of the feed solution and collected permeate. The cross-flow velocity in each fiber was set to 1.7 m·s$^{-1}$.

$$R = \frac{(\sigma_f - \sigma_p)}{\sigma_f} \times 100\% \quad (5)$$

In this equation, R is the salt rejection (%), $\sigma_f$ is the conductivity of feed solution (μS·cm$^{-1}$), and $\sigma_p$ is the conductivity of permeate solution (μS·cm$^{-1}$).

2.2.9 Osmotic Performance

The osmotic performance of the fibers was evaluated in both FO (selective-layer-facing-feed-solution) and PRO (selective-layer-facing-draw-solution) modes. The tests were conducted in counter-current configuration using 1 M NaCl as a draw solution at a cross-flow rate of 3 L·h$^{-1}$ per module (corresponding to the velocity of 2 m·s$^{-1}$ in the lumen). The experiment was carried out for 1 h and the osmotic water flux (Jw) (L·m$^{-2}$·h$^{-1}$) was determined by measuring the water transferred from the feed solution to the draw solution per membrane area per time. The reverse salt flux (Js) (g·m–2·h$^{-1}$) was determined by measuring the feed solution conductivity per membrane area per time. The amount of solute passing to the feed side was measured using a pre-determined calibration curve.

The structural parameter (S) was estimated by a fitting method using Eq. 6 for FO mode, $$S = \frac{D}{J_w} \ln \frac{B + A\pi_D}{B + J_w + A\pi_F} \quad (6)$$

and using Eq. 7 for PRO mode, $$S = \frac{D}{J_w} \ln \frac{B - J_w + A\pi_D}{B + A\pi_F} \quad (7)$$

Where $J_w$ (L·m$^{-2}$·h$^{-1}$) is the osmosis water flow, D (m$^2$·h$^{-1}$) is the solute diffusivity, πD (bar) is the osmotic pressure of draw solution A (water permeance) (L·m$^{-2}$·h$^{-1}$·bar$^{-1}$) and B (salt permeance) (L·m$^{-2}$·h$^{-1}$).

The salt permeance (B) were determined after Yip et al. [36], with a mass transfer coefficient (K) (L·m–2·h–1) according to the Lévêque correlation for a fully developed laminar velocity profile in a tube [37].

$$B = J_w\left(\frac{1-R}{R}\right)\exp\left(-\frac{J_w}{K}\right) \quad (8)$$

2.3 Results and Discussion 2.3.1 Intrinsic Characteristics of the Hollow-Fiber Support The intrinsic characteristics of the manufactured hollow fiber supports such as their dimension, porosity, burst pressure, and contact angle can be found in Table 2.3. In order to have a better understanding of the role of the molecular weight of the PEIs used, it was tried to eliminate the wall thicknesses influence on FO performance by fabrication the fibers with similar thicknesses. This is because wall thickness can influence the osmotic water flux (see example 1) and thus makes it difficult to focus on the influence of the molecular weight. With a relatively low wall thickness and open pore structure, the spun fibers still showed a high burst pressure of around 14 bars on average. This is indeed due to the high tensile strength of the polyamide-imide (Torlon). We argue that a burst pressure of bars will suffice for membranes used for FO, similar to the burst pressure of commercial ultrafiltration membrane where operating pressures typically are below bar. Hence, all membranes are mechanically suited to be used in FO processes. The variation in PEI molecular weight showed no effect on the burst pressure as well as no difference with the unmodified support. The fibers also exhibited a porosity of >73% which shows that they are very open and suitable as FO support. Actually, for porous media, porosities above 75% also means low tortuosity where both are beneficial for low ICP and thus high osmotic water flux, see example 1.

Here, a comparison was made with a fiber from the example which spun with 3 wt % more polymer (namely M0.12) in order to check the influence of 3 wt % reduction in polymer content on the intrinsic properties of the fiber. We show throughout this example that the 3 wt % reduction in polymer content is very well-reflected in the PWP, osmotic water flux, S parameter, and mechanical strength of the fibers.

For instance, the 3 wt % reduction in polymer is well-reflected in the PWP results where a 7-fold higher PWP was obtained for the newly spun 750K. This higher PWP clearly shows that the supports are much opener. In addition, the 3 wt % reduction also affected the burst pressure with a drop from 18 to 14 bars, which as discussed earlier, is still sufficient for FO applications.

TABLE 2.6

Dimensions, porosities, and burst pressures measured for the fibers spun, n = 3, the dimension determined by the dimension tool of the SEM. (M0.12 spun with 3 wt % more polymer content, data is taken from example 1 for comparison).

| | Unmodified | 2K | 25K | 750K | M0.12 |
|---|---|---|---|---|---|
| ID (mm) | 0.73 ± 0.01 | 0.69 ± 0.01 | 0.85 ± 0.01 | 0.73 ± 0.01 | 0.78 ± 0.01 |
| Wall thickness (mm) | 0.15 ± 0.01 | 0.16 ± 0.02 | 0.14 ± 0.02 | 0.13 ± 0.01 | 0.12 ± 0.01 |
| Porosity (%) | 77.1 ± 0.3 | 77.7 ± 0.2 | 79.7 ± 0.2 | 73.9 ± 0.1 | 76.1 ± 0.5 |
| Burst pressure (bar) | 13.9 ± 0.6 | 14.0 ± 1.0 | 13.6 ± 0.4 | 14.0 ± 2.0 | 18.9 ± 1.0 |
| Contact angle (°) | 80 ± 3 | 55 ± 3 | 54 ± 6 | 56 ± 5 | n.d. |

All three modified supports (2K, 25K, 750K) showed a lower contact angle than the unmodified support, which demonstrates that the PEI contributed to the hydrophilicity of the inner surface. In fact, a hydrophilic surface promotes wettability and is thus favorable for interfacial polymerization by allowing the IP (amine) solution to penetrate in all the surface pores. This ensures a deeper formation of the polyamide layer within the support pores and consequently a better adhesion of the nascent PA layer. Overall, the PEI molecular weight variation showed no significant difference in the intrinsic properties of the supports.

2.3.2 Morphology of the Hollow-Fibers

Figure 8:
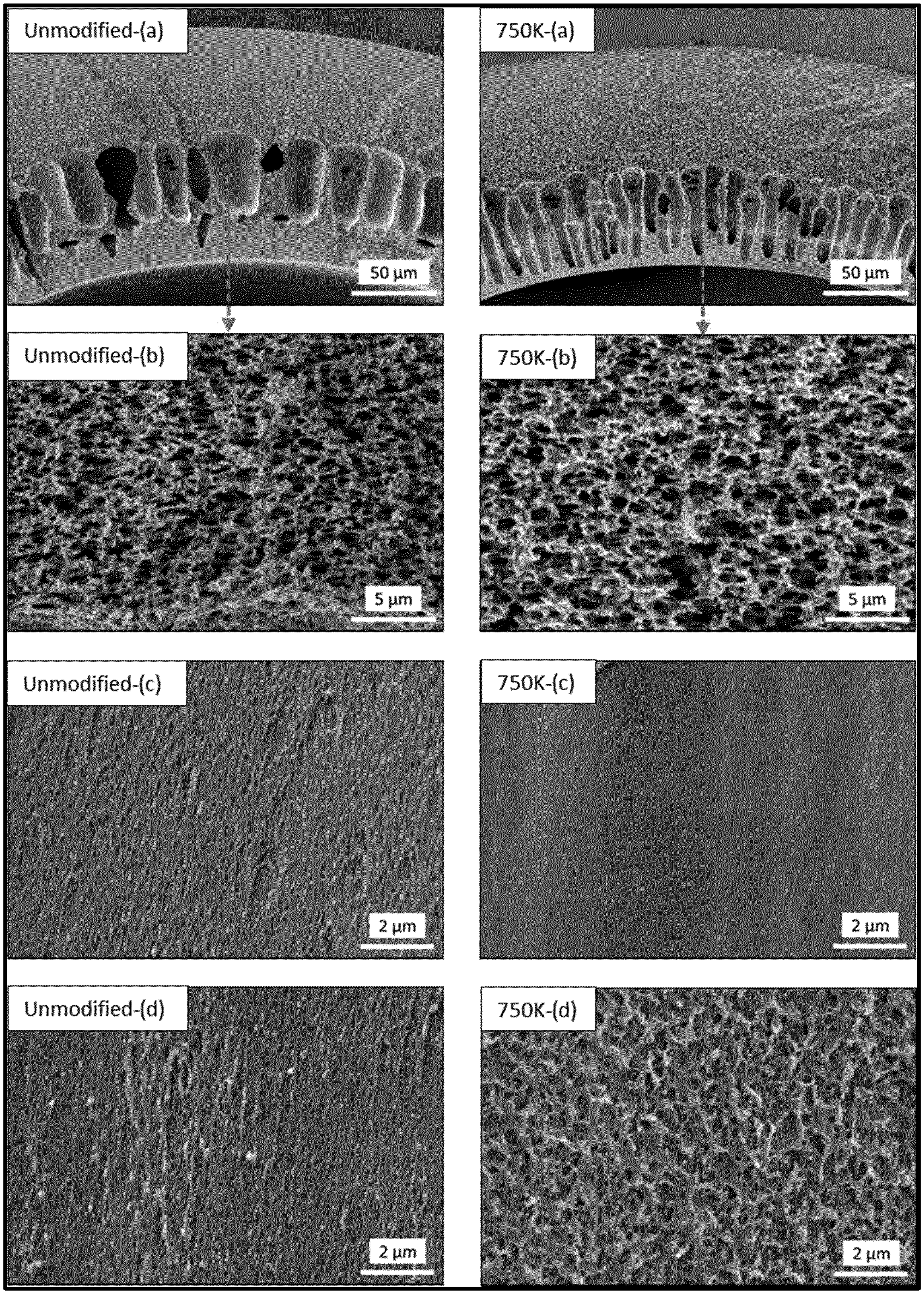
FIG. 8 shows the SEM images of the unmodified fiber versus 750K fiber, (a) cross-section, (b) the morphology of the middle part, (c) the inner surface before IP, (d) the inner surface after IP.

The SEM images of unmodified fibers and 750K fibers are shown in FIG. 8. for comparison purposes. From cross-section images of both fibers, a morphology of combined finger-like and spongy structures is observed (image Unmodified-(a) and 750K-(a)). This similarity shows that the surface modification with PEI had no influence on the overall structure of the fibers, which is actually advantageous because this shows that entire structure of the support can be independently tuned while still keeping the inner surface constant. Both types of fibers have an open structure, being highly open in the middle of the fibers, which is favorable in terms of reducing the ICP (image Unmodified-(b) and 750K-(b)). A quite visible difference in the inner surface of the unmodified and 750K fibers can be seen by looking at images Unmodified-(c) and 750K-(c). The unmodified fibers exhibited a rough, uneven, and defective inner surface, while the inner surface of the modified fiber (750K) is very smooth, uniform, and defect-free. A similar surface structure was seen for the other two HF support types modified with PEI, (2K and 25K fibers). In addition, these similarities indicate that there are no large effects of PEI molecular weight on the surface structure. It can clearly be seen that by using PEI, a defective and rough inner surface can be avoided. A defective surface is unfavorable because it leads to imperfections (pinholes) on the selective layer resulting in an unsuccessful IP-coating. The inner surface of both Unmodified and 750K after application of the IP can be seen from images (d). In FIG. **8*d*** 750K (right), a very typical and uniform PA layer can be observed with the ridge-valley structure, while this is not the case for unmodified fibers. The same PA layer structure was seen for the other two fiber types modified with PEI, (2K and 25K fibers—not shown here). Our results visually indicated that by modifying the support with PEI regardless of its molecular weight, the PA fabrication can be improved significantly.

Figure 9:
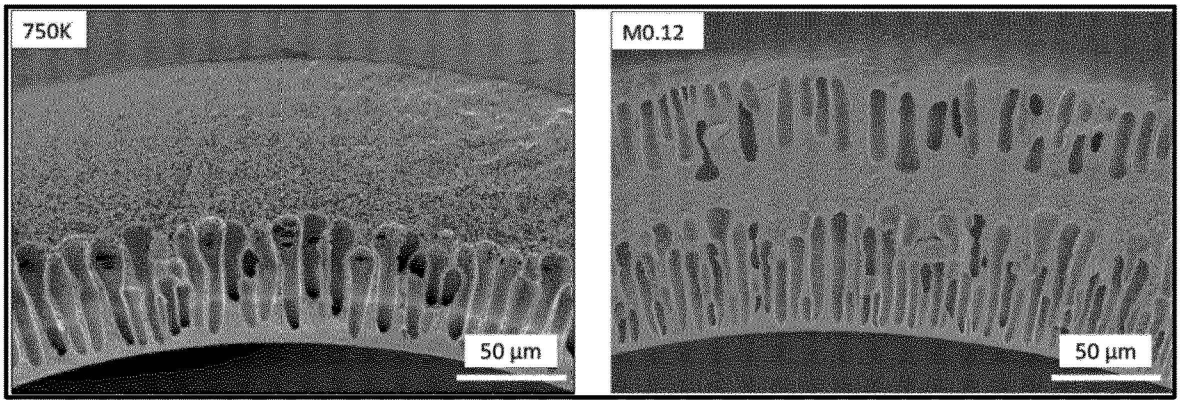
FIG. 9 discloses the cross-section image of the newly spun fiber (750K) as compared with fiber (M0.12) from chapter 5 spun with 3 wt % more polymer.

In addition, the cross-section morphology of fibers 750K and M0.12 are shown in FIG. 9 to visualize the influence of 3 wt % polymer reduction on the morphology. The 750K fiber exhibits a finger-like structure from lumen to the middle of the fiber combined with a highly open structure stretched to the shell. In contrast, M0.12 fiber has finger-like structure from both sides with a relatively denser middle part. The opener structure of the 750K as compared with M0.12 is evident from this cross-section images. We argue that especially the inner dense part of the M0.12 fiber severely contributes to the ICP in FO processes.

2.3.3 Zeta Potential of Hollow-Fibers Before IP

Figure 10:
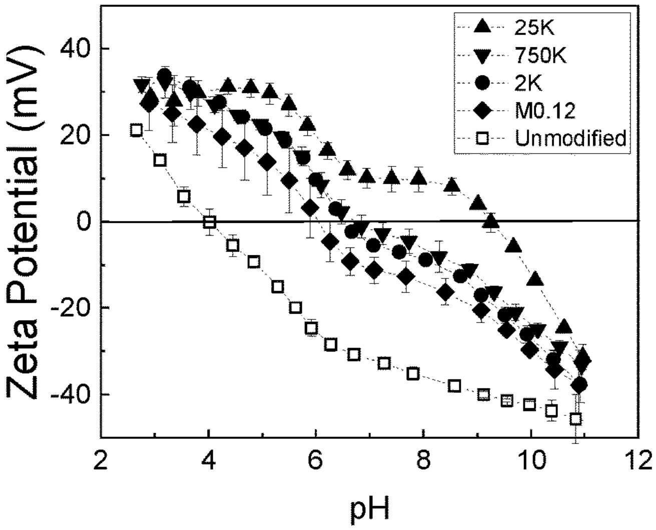
FIG. 10 depicts the zeta potential of the inner surface of the HF supports as a function of pH, n=12. (M0.12 spun with 3 wt % more polymer content and the data is taken from chapter 5 for comparison).

The zeta potential at the inner surface of the HF supports was determined (FIG. 10). This was done to evaluate the surface modification with PEI. In general, the three modified fibers showed a more positive zeta potential than their unmodified counterpart confirming the existence of the positively-charged PEI. This result is in agreement with our previous study where PEI with a molecular weight of 750 k was used for single-step modification (zeta potential of M0.12 is added to FIG. 10). This shows that 3 wt % polymer reduction has shown no influence on the PEI-modification of surface. However, the zeta potential of all three fibers does not completely reflect that of pure PEI (as already explained in example 1). Lower zeta potentials in the pH range studied are observed, which shows that the support base-polymer (unmodified PAI) has influenced the final zeta potential. This means that the PEI has become an integral part of the support thus possessing proper adhesion to the entire support.

2.3.4 Pure Water Permeance (PWP) and Salt Rejection

Figure 11:
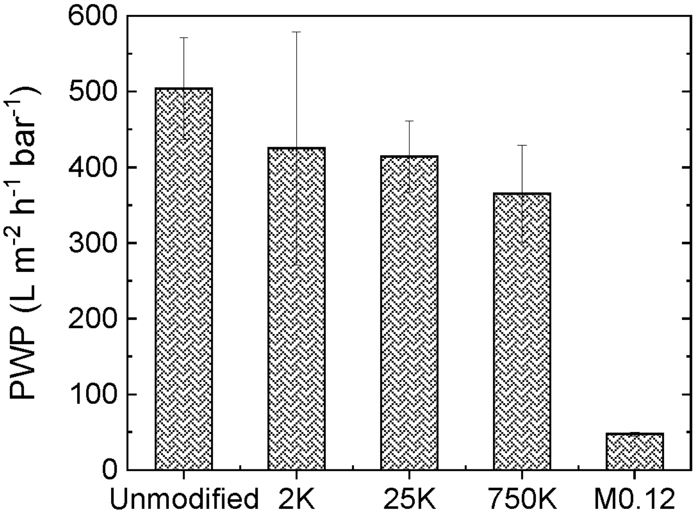
FIG. 11 shows the PWP of the supports measured in inside-out dead-end configuration at 1 bar, n=3. (M0.12 spun with 3 wt % more polymer content and the data is taken from chapter 5 for comparison).

Firstly, the pure water permeances of the fibers were measured before IP-coating (FIG. 11). All four types of fibers showed a high pure water permeance which indicates that they possess a very open structure. This is advantageous as an open structure implies a low mass transport resistance which is favorable for supports to be used in FO applications. The low transport resistance leads to a fast movement of the draw solute towards the selective layer, which in turn decreases the ICP. The modified HF supports (2K, 25K, and 750K) showed a slightly lower permeance as compared with the unmodified fibers. This demonstrates that the single-step modification only led to only minor resistance toward mass transport; thus, just a small influence on the ICP is expected. The PWP of the 750K showed a significant increase as compared with its counterpart spun with 3% higher polymer concentration (M0.12) (FIG. 11). This was as high as 365±64 ($L\cdot m^{-2}\cdot h^{-1}\cdot bar^{-1}$) for 750K and 48±2 ($L\cdot m^{-2}\cdot h^{-1}\cdot bar^{-1}$) for M0.12, which shows the notably opener structure of the newly spun fiber (750K) as a result of 3% reduction in the polymer content.

Figure 12:
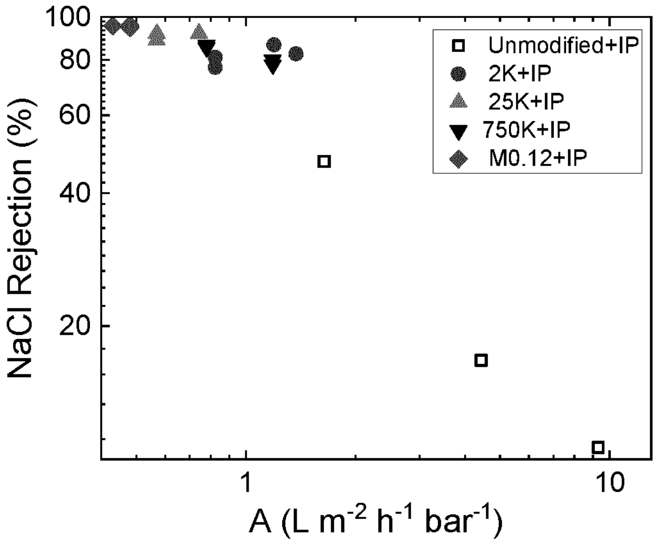
FIG. 12 shows the individual data for NaCl rejections of the fibers after IP coating at 2 bars using 500 mg·L−1 NaCl solution versus their water permeance measured at 2 bars using DI water. (M0.12 spun with 3 wt % more polymer content and the data is taken from chapter 5 for comparison).

The PWP drops considerably after IP for all four fiber types to around 1 ($L\cdot m^{-2}\cdot h^{-1}\cdot bar^{-1}$) (FIG. 12, at the X-axis). We observed no significant effect on the molecular weight of the PEI used in the preparation of the modified membranes. The Unmodified+IP HF membranes (squares) show a higher water permeance with a greater variation than the modified fibers. This indicates the unsuccessful IP for the Unmodified+IP membrane as a result of no PEI on its surface which led to low NaCl rejections as well (FIG. 12 Y-axis). Instead, all three modified HF membranes showed a high success for IP by having NaCl rejections above 77% with a low deviation of the data. Specifically, the results of M0.12 from example 1 is added to the plot which also shows low deviation of data as a result of PEI on its surface. However, M0.12 showed a lower PWP than 750K which is partly attributed to its denser support as a result of 3 wt % more polymer in its structure.

2.3.5 Osmotic Performance

Figure 13:
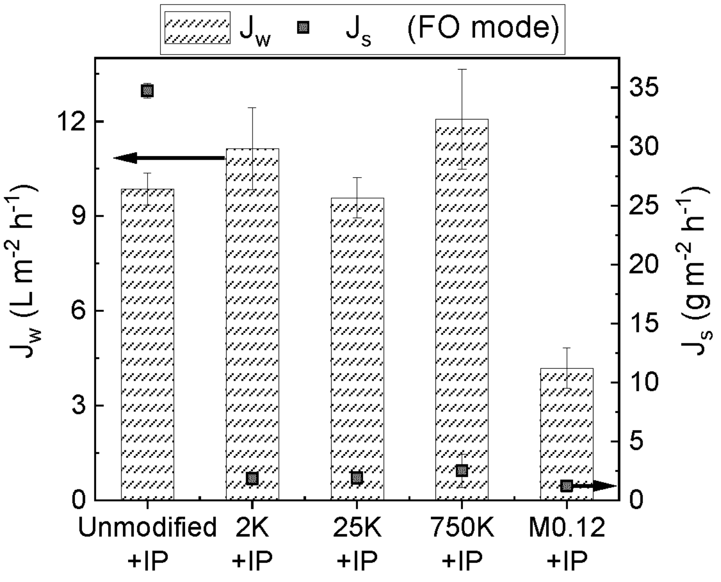
FIG. 13 discloses the osmotic performance of the HF membranes in FO mode using 1M NaCl as draw solution and DI water as feed solution. Left y axis/bars: water flux. Right y axis/squares: reverse salt flux, n=3. (M0.12 spun with 3 wt % more polymer content and the data is taken from chapter 5 for comparison).

The osmotic performance of the IP-coated fibers was determined in both FO and PRO modes using 1 M NaCl as a draw solution, and DI water as a feed solution (FIG. 13). As shown in FIG. 13, all four membranes (Unmodified+IP, 2K+IP, 25K+IP, 750K+IP) showed a water flux above 9 ($L\cdot m^{-2}\cdot h^{-1}$). The similarity in osmotic water flux of four membranes clearly confirms that the osmotic water flux is mainly influenced by the support structure (properties) of an FO membrane and in a lower degree by its selective layer when A (water permeance) is higher than 1 ($L\cdot m^{-2}\cdot h^{-1}\cdot bar^{-1}$) as such obtained for our membranes. All four fibers roughly possessed the same structure, porosity, and wall thickness; thus assumingly a similar ICP level, which leads to a roughly identical water fluxes. However, the defects in the selective layer of the Unmodified+IP membrane resulted in a high reverse salt flux (>34 $g\cdot m^{-2}\cdot h^{-1}$). On the other hand, the low reverse salt flux of the modified fibers (<2.5 $g\cdot m^{-2}\cdot h^{-1}$) indicates the defect-free PA layer which we attribute to PEI-modification of the surface. The membrane 750K+IP demonstrated a water flux of 12±2 ($L \cdot m^{-2} \cdot h^{-1}$) which is 4 times higher than its counterpart spun with 3% more polymer content (M0.12). This clearly shows that the opener support structure of 750+IP is beneficial for the obtained osmotic water flux.

Figure 14:
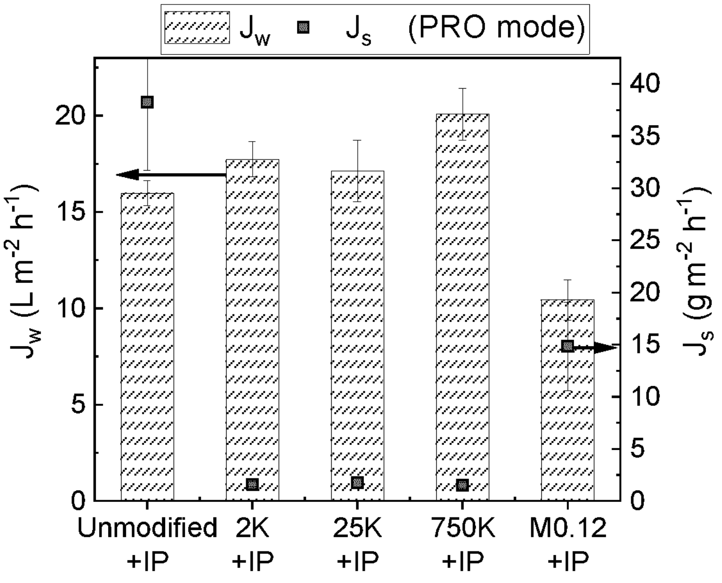
FIG. 14 shows the osmotic performance of the HF membranes in PRO mode using 1M NaCl as draw solution and DI water as feed solution. Left y axis/bars: water flux. Right y axis/squares: reverse salt flux, n=3. (M0.12 spun with 3 wt % more polymer content and the data is taken from chapter 5 for comparison).

In PRO mode (FIG. 14), all four fibers spun in this study showed water fluxes of above 15 ($L \cdot m^{-2} \cdot h^{-1}$), higher than those achieved in FO mode, which is typical for the osmotic process. The reason is that concentrative ICP occurring in PRO mode is far less detrimental than dilutive ICP occurring in FO mode. The comparison of osmotic water flux between 750K+IP and M0.12+IP in PRO mode followed the same trend as for FO mode where a higher flux was achieved for 750K+IP. The reverse salt fluxes in PRO mode of the membranes presented here were comparable to FO mode.

Figure 15:
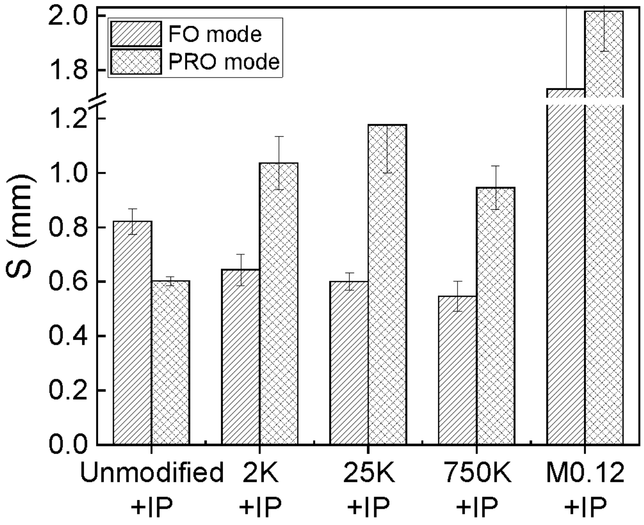
FIG. 15 shows the structure parameter of the HF membranes in FO and PRO mode using 1M NaCl as draw solution and DI water as feed solution, n=3.

The structural parameters of all membranes were calculated using Eqs. (6) and (7) and are plotted in FIG. 15. In FO mode, the S parameter was determined to be around 0.6 mm for the modified membranes, while this was higher for the Unmodified+IP (0.75 mm). This can be attributed to the leaky character of the selective layer, which is not properly accounted for in Eqs. 6 and 7. Notably, the structural parameter was as high as 1.7±0.4 mm for M0.12 as compared with 0.55±0.05 mm for the newly spun membrane (750K+IP). In PRO mode, the modified membranes showed a higher S parameter as compared with FO mode, while this was lower for the Unmodified+IP membrane. This discrepancy is indicative of the sensitivities of the S parameter as a true characterization of a support.

2.4 Conclusion

This study presented a single-step method to fabricate open hollow fiber membrane supports modified with PEI for FO. The reason for the surface modification with PEI was to create a smooth and defect-free inner surface for more successful IP-coating. The surface modification was implemented simultaneously during the spinning of the support using PEIs with three different molecular weights. To fabricate the open fibers, we used 17% less polymer in our polymer dope solution, constituting to a 3 wt % reduction in the dope as compared with our previous study. The reduction in polymer concentration was surprisingly not reflected by the porosity of the newly spun fibers, however it did become apparent by the SEM images, PWP, osmotic water flux, and S parameter. The latter three all significantly increased. The nascent HF supports showed a high PWP of around 400 ($L \cdot m^{-2} \cdot h^{-1} \cdot bar^{-1}$) which indicated that they are highly open and this can promote low ICP. After the application of IP, the modified fibers showed adequate NaCl rejections of >77% as compared to an average of 27% for the unmodified membrane which proved that the surface modification provided a defect-free surface. The osmotic water flux was above 9 ($L \cdot m^{-2} \cdot h^{-1}$) on average in FO mode, while this was more than 15 ($L \cdot m^{-2} \cdot h^{-1}$) in PRO mode while having very low reverse salt fluxes at both modes for the modified fibers. The most important influence of the 3% reduction in the polymer content was a 4-fold increase in the FO water flux and a significant reduction in the S parameter. In addition, the variation in PEI molecular weight had no influence on the nascent HF supports properties such as burst pressure, water flux, inner surface morphology, NaCl rejection, and osmotic performance.

This study shows that the surface modification with PEI regardless of its molecular weight significantly improves the IP reaction. Moreover, it demonstrates that by targeted design a highly open support with improved permeance can be manufactured which is favorable for FO. This novel method and chosen polymers will enable the fabrication of very thin, open, defect-free, and yet robust HF supports for FO membranes.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The invention claimed is:

1. A process for preparing a hollow fiber comprising the steps of:

a) providing a dope solution comprising polyamide imide (PAI), b) providing an aqueous bore solution comprising polyethylene imine (PEI), c) extruding the dope solution in a cross-sectional annular shape and ejecting the bore solution in the center of the annular shape, d) allowing the PAI and the PEI to react, thereby forming an internal surface layer comprising the cross-linked reaction product, and e) forming a polyamide Thin Film Composite (TFC) layer by interfacial reaction of aqueous di- or triamine compound and organic di- or triacylhalide compound on the internal surface layer comprising the cross-linked reaction product, such that the internal surface layer functions as a primer for attaching the TFC layer to a PAI support layer.

2. The process according to claim 1, wherein the dope solution and/or the aqueous bore solution further comprises an aprotic solvent selected from the group consisting of N-methyl pyrrolidone (NMP), dimethylacetamide (DMAC), dimethylsulfoxide (DMSO), and dimethylformamide (DMF), or mixtures thereof.

3. The process according to claim 1, wherein the dope solution further comprises a polymer selected from the group consisting of polyphenylsulfone (PPSU), polyethersulfone (PES), Sulfonated polyethersulfone (SPES), polysulfone (PSU), polyetheretherketone (PEEK), high-temperature sulfone resins, self-reinforced polyphenylene, polybenzimidazole (PBI), polyimide (PI), polyetherimide (PEI), polyphenylene sulfide (PPS), or mixtures thereof.

4. The process according to claim 1, wherein the solution viscosity of the PAI in 25 wt % NMP and measured at 40° C. is 30,000 cP or less.

5. The process according to claim 1, wherein the dope solution further comprises a glycol selected among ethylene glycol, 1,2-propylene glycol, 1,3-propylene glycol, glycerol or polyethylene glycol (PEG).

6. The process according to claim 1, wherein the PEI of the aqueous bore solution has an average molecular weight (Mw) of 100,000 g/mol or above and is optionally branched.

7. The process according to claim 1, wherein the nascent hollow fiber after extrusion is moved through an air gap before being coagulated in a non-solvent.

8. The process according to claim 1, wherein a plurality of the hollow fibers is assembled in a module before the polyamide TFC layer is formed.

9. The process according to claim 1, wherein aquaporin water channels are incorporated into the TFC layer.

10. The process according to claim 9, wherein the aquaporin water channel incorporated into the TFC layer is assembled in a nanostructure comprising polyethyleneimine, and is first solubilized in a detergent, the detergent being selected from the group consisting of lauryl dimethylamine N-oxide (LDAO), octyl glucoside (OG), dodecyl maltoside (DDM) or a combination thereof.

11. The process according to claim 10, wherein the aquaporin water channel incorporated into the TFC layer is assembled in a nanostructure or vesicle, the nanostructure or vesicle comprising an amphiphilic diblock copolymer of the PMOXA-PDMS type and PDMS comprising a functional end group comprising one or more of amine, carboxylic acid, and/or hydroxy groups.

* * * * *